US010184465B2

(12) United States Patent
Enis et al.

(10) Patent No.: US 10,184,465 B2
(45) Date of Patent: Jan. 22, 2019

(54) GREEN COMMUNITIES

(71) Applicant: EnisEnerGen, LLC, Henderson, NV (US)

(72) Inventors: Ben Enis, Henderson, NV (US); Paul Lieberman, Torrance, CA (US)

(73) Assignee: EnisEnerGen, LLC, Henderson, NV (US)

( * ) Notice: Subject to any disclaimer, the term of this patent is extended or adjusted under 35 U.S.C. 154(b) by 0 days.

(21) Appl. No.: 15/585,035

(22) Filed: May 2, 2017

(65) Prior Publication Data

US 2018/0320679 A1    Nov. 8, 2018

(51) Int. Cl.

| F28D 20/02 | (2006.01) |
|---|---|
| F04B 39/06 | (2006.01) |
| F03D 9/10 | (2016.01) |
| F04B 39/10 | (2006.01) |
| F04B 39/00 | (2006.01) |
| F25B 27/00 | (2006.01) |

(52) U.S. Cl.
CPC .............. *F04B 39/062* (2013.01); *F03D 9/10* (2016.05); *F04B 39/1033* (2013.01); *F04B 39/00* (2013.01); *F25B 27/00* (2013.01)

(58) Field of Classification Search
CPC ...... C02F 1/10; C02F 1/12; C02F 1/22; C02F 2103/08; C02F 2209/02; C02F 2303/16; C02F 2303/26; Y02A 20/132; Y02A 20/128; Y02W 10/37; F03D 9/17; F02C 6/16; H02S 10/20; H02S 10/12; H02J 3/381; H02J 15/00
See application file for complete search history.

(56) References Cited

U.S. PATENT DOCUMENTS

| 8,196,405 | B2 * | 6/2012 | Wolf | C25B 1/12 |
| | | | | 60/649 |
| 2007/0234749 | A1 * | 10/2007 | Enis | C02F 1/22 |
| | | | | 62/238.2 |
| 2007/0295673 | A1 * | 12/2007 | Enis | C02F 1/10 |
| | | | | 210/766 |
| 2008/0047271 | A1 * | 2/2008 | Ingersoll | F01K 27/00 |
| | | | | 60/645 |
| 2014/0183869 | A1 * | 7/2014 | Enis | F04B 23/02 |
| | | | | 290/54 |
| 2014/0245756 | A1 * | 9/2014 | Morgan | F02C 1/04 |
| | | | | 62/50.1 |

(Continued)

*Primary Examiner* — Mark A Laurenzi
*Assistant Examiner* — Shafiq Mian
(74) *Attorney, Agent, or Firm* — Mu P.C.

(57) ABSTRACT

A green community system centered around a transfer line compressed air energy storage system (TL-CAES). The TL-CAES system can supply compressed air to distant locations, and can be feed into companders to produce super-chilled air which can be used to improve the efficiency of natural gas generator sets. The generator sets can provide facilities with electricity and the super-chilled air can provide the facilities with heating, ventilation, and air-conditioning systems. The compressed air in the TL-CAES system is to be provided by a transportable compressed air storage system (T-CAES). Air compressors driven powered by green energy sources provide compressed air for the T-CAES system. The compressed air supply in conjunction with companders can further systems such as water purification and carbon dioxide extraction.

16 Claims, 43 Drawing Sheets

(56) References Cited

U.S. PATENT DOCUMENTS

| | | | | |
|---|---|---|---|---|
| 2014/0333069 A1* | 11/2014 | Lieberman | ............... | F03D 9/17 |
| | | | | 290/52 |
| 2016/0090998 A1* | 3/2016 | Kraft | ....................... | F02C 6/16 |
| | | | | 60/327 |
| 2016/0216044 A1* | 7/2016 | Narine | ..................... | F02C 1/04 |
| | | | | 60/645 |
| 2017/0097284 A1* | 4/2017 | Brostmeyer | ......... | G01M 15/14 |
| | | | | 60/649 |
| 2017/0138674 A1* | 5/2017 | Pourima | .................. | F02C 6/16 |
| | | | | 60/649 |
| 2017/0321967 A1* | 11/2017 | Laughlin | .................. | F02C 1/10 |
| | | | | 60/649 |
| 2018/0058320 A1* | 3/2018 | Macnaghten | ............. | F02C 6/16 |
| | | | | 60/649 |

\* cited by examiner

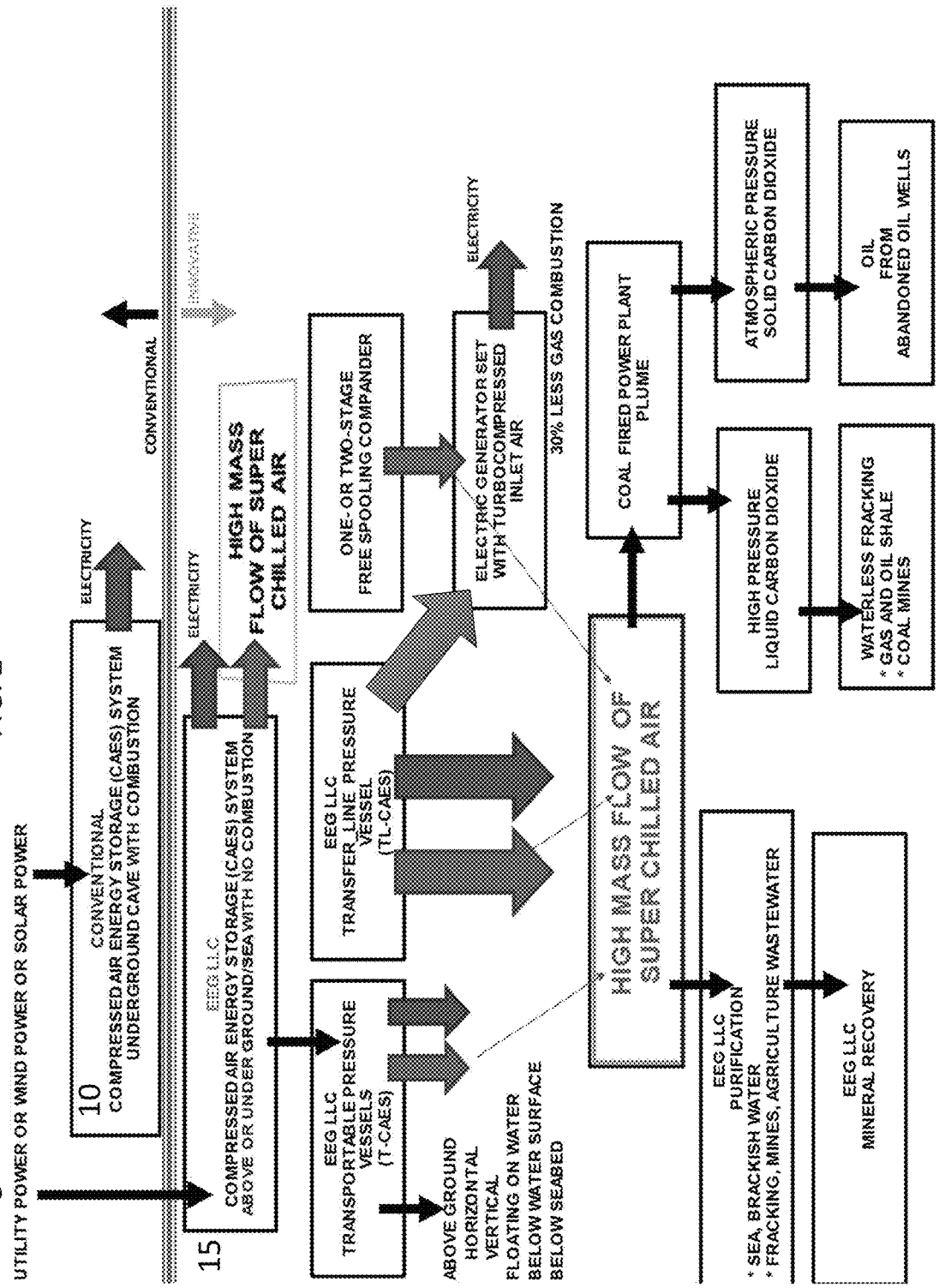

FIG. 4c

T-CAES SYSTEM (200 psig exhaust air)
WIND TURBINE FARM or UTILITY POWER IS NEARBY air compressor                STP Air
12,000    kW              520 deg R
0.746     kW/hp           14.696 psia
16,086    hp              0.076 # air/cu ft
2.2       scfm/hp
35,389    scfm 18 hours
38,219,839   scf
2,916,535    # air use four air compressors, each at 3,000 kW so that when wind diminishes below design speed,
so that fewer compressors will be used and all will operate at full electrical power input pressure vessels manifolded in stack
8         ft diameter                          100 ft length per vessel
9,200     ft total length                      2 rows long
462,442   cu ft                                23 tanks wide
1,214.47  psia when filled                     2 tanks high
14.67     psia                                 9,200 ft length total length of all vessels
6,317     # air/cu ft @ 1,200 psig and 60 deg F
2,923,411 # air in pressure vessel when full 214.67    psia when exhaust stops
1.1167    # air/cu ft @ 200 psig and 60 deg F
516,389   # air in pressure vessel when full

2,405,022  # air available to turboexpander electric generator              turboexpander exhaust
6,100     kWe              6,100 kWthermal
0.746     kW/hp
8,177     hp
10.6      scfm/hp
86,676    scfm
6         hours
360       minutes
31,203,217   scf
2,381,100  # air required for turboexpander

FIG. 4d

T-CAES SYSTEM (300 psig exhaust air)
WIND TURBINE FARM or UTILITY POWER IS NEARBY air compressor                          STP Air
       12,000 kW                    520 deg R
        0.746 kW/hp              14.696 psia
       16,086 hp                   0.076 #air/cu ft
            2.2 scfm/hp
       35,389 scfm 18 hours
       38,219,839 scf
        2,916,535 #air use four air compressors, each at 3,000 kW so that when wind diminishes below design speed,
so that fewer compressors will be used and all will operate at full electrical power input pressure vessels manifolded in stack
            8 ft diameter                              100 ft length per vessel
        9,200 ft total length                            2 rows long
          462,442 cu ft                                 23 tanks wide
        1,214.47 psia when filled                        2 tanks high
           14.67 psia                                9,200 ft length total length of all vessels
        6.317 #air/cu ft @ 1,200 psig and 60 deg F
        2,921,411 #air in pressure vessel when full 314.67 psia when exhaust stops
        1.53368 #air/cu ft @ 300 psig and 60 deg F
          756,940 #air in pressure vessel when full 2,164,471 #air available to turboexpander electric generator                      turboexpander exhaust
        6,165 kWe                        6,165 kWthermal
        0.746 kW/hp
        8,264 hp
            9.54 scfm/hp
       78,839 scfm
            6 hours
          360 minutes
       28,382,139 scf
        2,165,825 #air required for turboexpander

FIG. 4e

COMPRESSED AIR STORAGE VESSEL
4 FT DIA
2.37 INCH WALL THICKNESS
40,000 FT LONG
125,663.7 CU FT
9,190,998.1 CU FT AT 1214.67 PSIA and 70 DEG F
1,858,870.3 CU FT AT 214.67 PSIA and 70 DEG F
7,352,127.7 STD CU FT AVAILABLE 42,286,229.8 POUNDS WEIGHT OF STEEL TANK
125,663.7 SQ FT CYLINDRICAL AREA 0.12 BTU/(# F) STEEL
0.24 BTU/(# F) AIR

70 F INITIAL AIR TEMP IN TANK
70 F INITIAL TANK WALL TEMP

STEEL PIPE
1,250.00 PSIA INTERNAL PRESSURE
1,235.33 PSIG
4 FT DIA
50,000 PSI ELASTIC LIMIT
0.593 INCHES REQUIRED
4 SAFETY FACTOR
2.37 INCHES WITH SAFETY FACTOR

2 SAFETY FACTOR
1.19 INCHES WITH SAFETY FACTOR

TURBOEXPANDER/GENERATOR
3300 KW
4423.6 HP 9.2 SCFM/HP
40,697 SCFM

COMPRESSED AIR STORAGE VESSEL
4 FT INSIDE DIAMETER
2.37 OR 1.19 INCH WALL THICKNESS
1,214.30 PSIA IN STORAGE VESSEL INITIALLY
70 DEG F INITIAL WALL TEMPERATURE

| WALL THICKNESS (INCHES) | FINAL PRESSURE (PSIA) | FINAL TEMPERATURE* (DEG F) |
|---|---|---|
| 2.37 | 300 | 53.4 |
| 2.37 | 200 | 51.5 |
| 2.37 | 100 | 49.7 |
| 1.19 | 300 | 39.6 |
| 1.19 | 200 | 36 |
| 1.19 | 100 | 32.3 |

FIG. 5b

F-CAES SYSTEM
WIND TURBINE FARM or UTILITY POWER IS NEARBY air compressor

| | | STP Air | |
|---|---|---|---|
| 12,000 | kW | 520 deg R | |
| 0.746 | kW/hp | 14.696 psia | |
| 16,086 | hp | 0.076 # air/cu ft | |
| 2.2 | scfm/hp | | |
| 35,389 | scfm | | |

18 hours
38,219,839 scf
2,916,535 # air use four air compressors, each at 3,000 kW so that when wind diminishes below design speed, so that fewer compressors will be used and all will operate at full electrical power input pressure vessels manifolded in stack

| | | | |
|---|---|---|---|
| 8 | ft diameter | 100 ft length per vessel | |
| 18,000 | ft total length | 3 rows long | |
| 904,779 | cu ft | 30 tanks wide | |
| 1,214.47 | psia when filled | 2 tanks high | |
| 14.67 | psia | 18,000 ft length total length of all vessels | |
| 6,317 | # air/cu ft @ 1,200 psig and 60 deg F | | |
| 5,715,804 | # air in pressure vessel when full | | |

214.67 psia when exhaust stops
1.1167 # air/cu ft @ 200 psig and 60 deg F
1,010,327 # air in pressure vessel when full 4,705,477 # air available to turboexpander electric generator           turboexpander exhaust

| | | | |
|---|---|---|---|
| 12,000 | kWe | 12,000 kW thermal | |
| 0.746 | kW/hp | | |
| 16,086 | hp | | |
| 10.6 | scfm/hp | | |
| 170,509 | scfm | | |
| 6 | hours | | |
| 360 | minutes | | |

61,383,378 scf
4,684,132 # air required for turboexpander

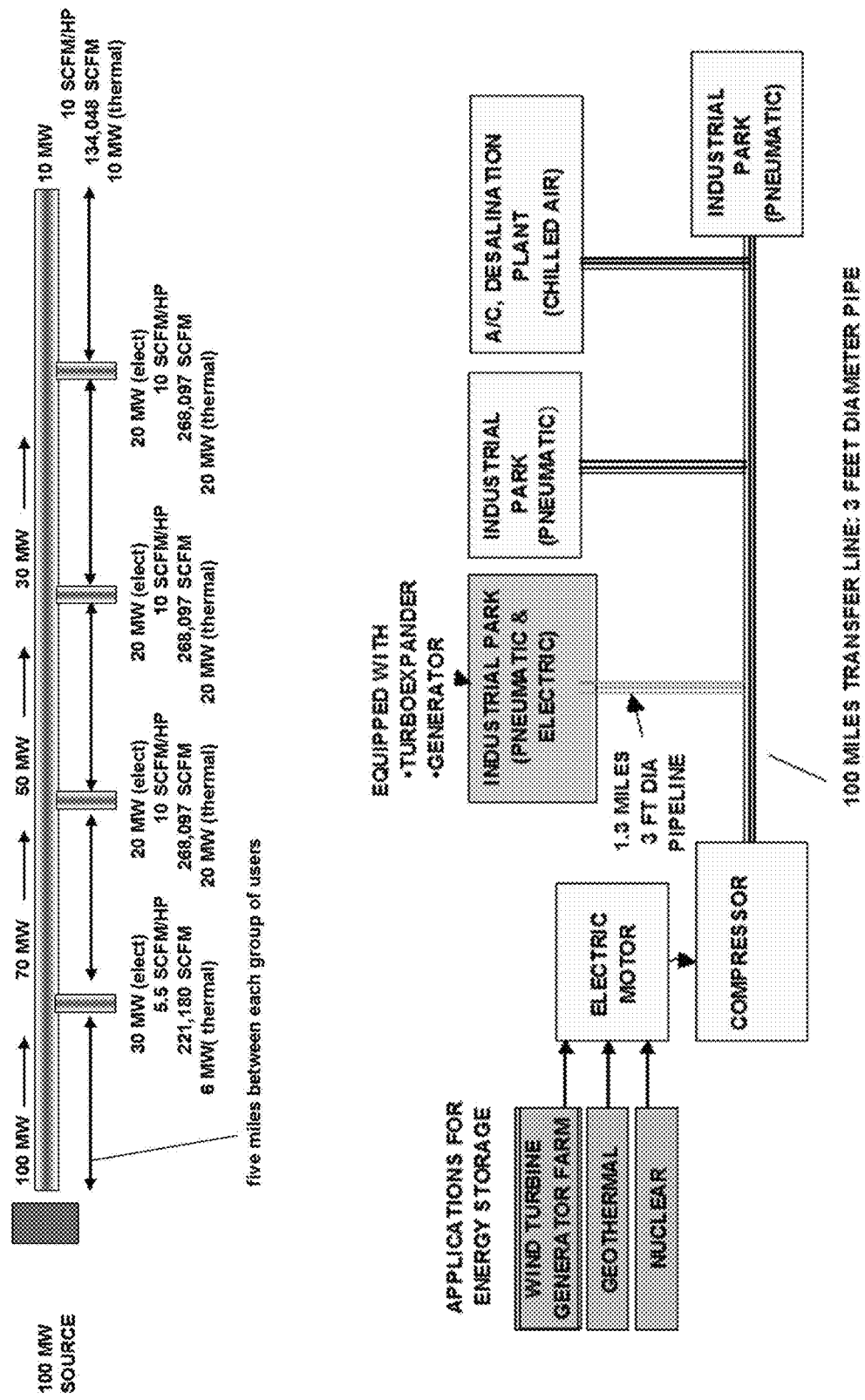

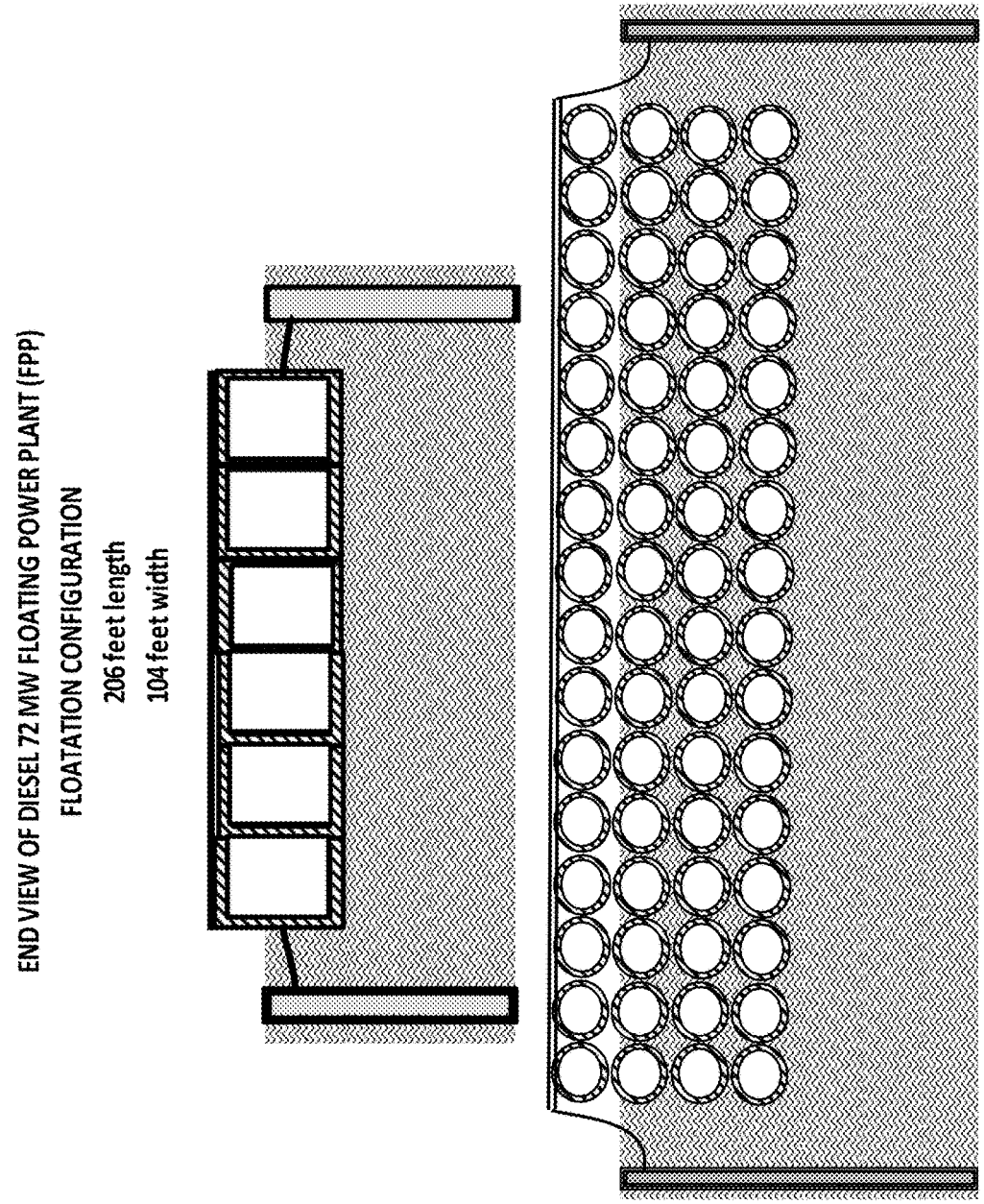

FIG. 10c

Aerosol Particle Deposition and Distribution In Bifurcating Ventilation Ducts", Journal of Hazardous Materials B116 (2004) 249–255

Fig. 6. Particle deposition efficiency in a 90° bend for the curvature ratio of 0.05 (♦), 0.1 (■) and 0.25 (○). The volumetric flow rate is $1.86 \times 10^{-2}$ m$^3$/s.

FIG. 18d

CHAMBER #1 CALCULATION

TURBOEXPANDER/GENERATOR
- 10,000 KW
- 1.34102 HP/KW
- 13,410 HP
- 10 SCFM AIR/HP
- 134,102 SCFM
- 0.076 # AIR/SCF
- 10,192 # AIR/MIN
- 0.24 BTU/(#F)
- -175 DEG F
- -6.16 DEG F  NaCl
- (412,986) BTU/MIN AVAILABLE

- 218 GALLONS SALT WATER/MINUTE
- 0.134 CU FT/GAL
- 64.27 # SALT WATER/CU FT
- 8.59 # SALT/GALLON SALT WATER
- 1,872.98 # SALT WATER/MIN
- 1 BTU/(#F)
- 70 F
- -6 F
- 144 BTU/# FUSION
- 412,056 BTU/MIN REQUIRED

CHAMBER #2 CALCULATION

MINERAL RECOVERY
- 715 KW
- 1.34102 HP/KW
- 959 HP
- 10 SCFM AIR/HP
- 9,588 SCFM
- 0.076 # AIR/SCF
- 729 # AIR/MIN
- 0.24 BTU/(#F)
- -175 DEG F
- -6.16 DEG F  NaCl
- (29,529) BTU/MIN AVAILABLE

- 19.9 GALLONS SALT WATER/MINUTE
- 0.134 CU FT/GAL
- 76.9 # SALT WATER/CU FT
- 10.28 # SALT WATER/GALLON
- 204.57 # SALT WATER/MIN
- 1 BTU/(#F)
- -4 F
- -6 F
- 144 BTU/# FUSION
- 29,868 BTU/MIN REQUIRED

FIG. 18e

Chamber #1
3% Salt Solution at Start

1839.157 pounds of bound water
55.95 pounds of Salt
1,865.11 pounds of One Phase Solution

23.3% Salt Solution at Eutectic Temperature
240.1288 pounds of brine solution
55.95 pounds of salt in brine solution
184.18 pounds of bound water
10.8605 pounds per gallon solution

1,625 pounds of free water
195.1 gallons of free water

Chamber #2

204.1 pounds of brine solution
47.56 pounds of salt in brine solution
156.55 pounds of water bound
27.63 pounds of water free
30.61642 pounds of brine solution
7.13 pounds of salt in brine solution
23.48 pounds water bound
133.07 pounds of water free
160.70 totalpounds water removed
40.42 total pounds salt removed

DIMENSIONS OF SPRAY CHAMBER #2

<u>WATER VOLUME AFTER ICE REMOVED</u>
19.9 GALLONS
2.66 CU FT

<u>AIR VOLUME</u>
9,588 SCF
5,156 CF AT -175 F
8,213 CF AT -6 F
6,685 CF AVERAGE

TANK DIMENSIONS FOR WATER/AIR MIXTURE
6,687 CU FT REQUIRED
10 FT DIA
28 FT TALL
2,199 CU FT PER TANK AVAILABLE
3.0 TANKS

Pressure-Temperature phase diagram for CO₂.

| FLUE GAS | FREEZING or BOILING POINT (°F) |
|---|---|
| CO2 | -109 @ 1 atm ; -69.8 @ 5 atm |
| H2O | +32 |
| O2 | -297.33 |
| CO | -312.7 |
| N2 | -320.431 |
| N2O | -127.26 |
| NO2 | 11.8 |
| SO2 | -103.9 |

| | GAS FIRED FLUE GAS | COAL FIRED FLUE GAS |
|---|---|---|
| CO2 | 7.4 TO 7.7% | 12.5 TO 12.8% |
| H2O | 14.6% | 6.2% |
| O2 | 4.45% | 4.4% |
| CO | 200 TO 300 PPM | 50 PPM |
| N2 | 73 TO 74% | 76 TO 77% |
| NOx | 60 TO 70 PPM | 420 PPM |
| SO2 | | 420 PPM |

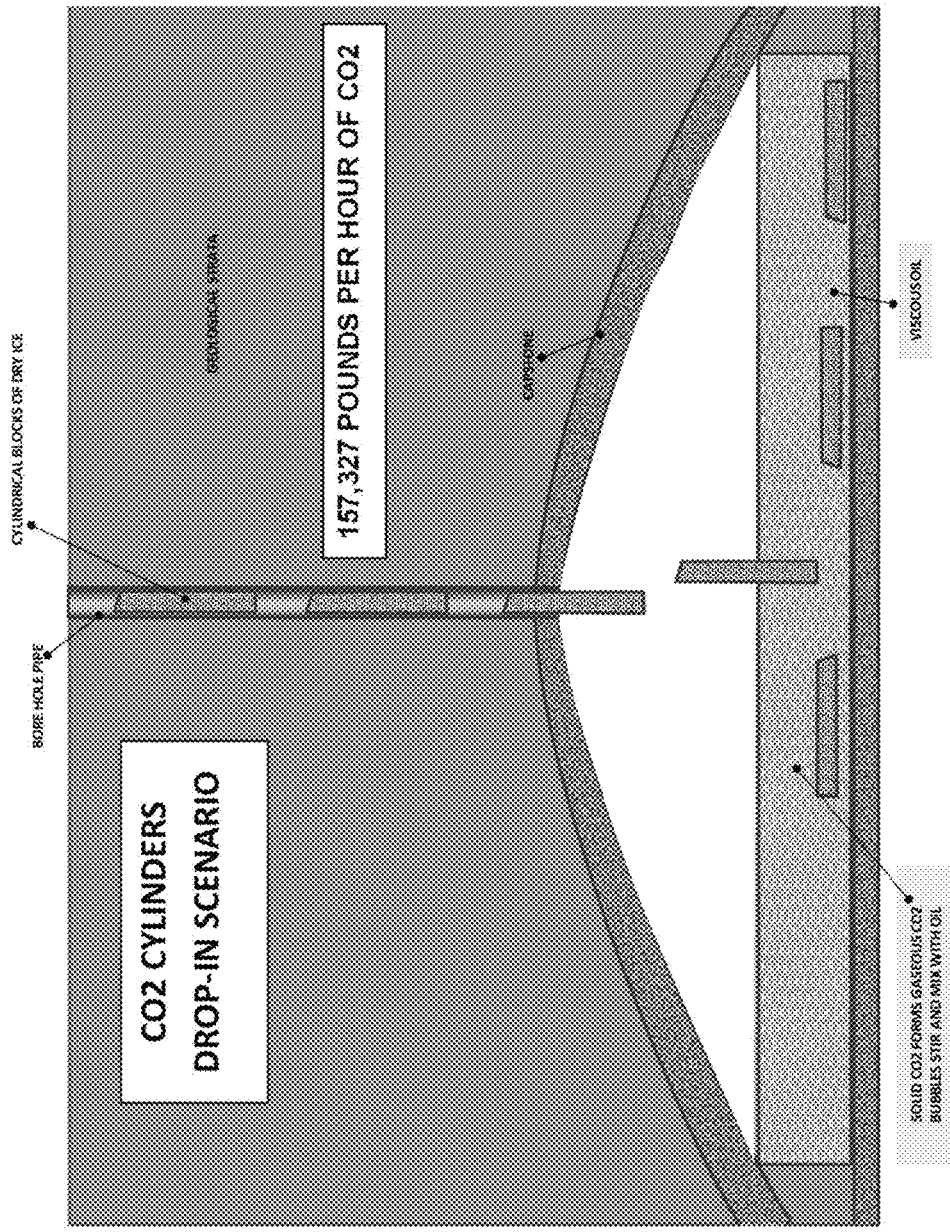

GREEN COMMUNITIES

BACKGROUND THE INVENTION

1. Field of Invention

The present invention relates to the field of energy storage and energy transfer from such green energy (wind, solar, etc.) systems as well as use of inexpensive night time conventional utility power for delivery of the power during the expensive daytime time-of-use price rates.

However, in addition to the energy storage capability of all these competing battery systems there are important by-products of the T-CAES system and TL-CAES system not available to the competing energy storage systems. These by-products include the storage and transfer of the energy without the use of high voltage power lines as well as all the other useful by-products that become possible because of the exhaust of the high mass flow of super-chilled air.

2. Description of Related Art

The use of compressed air energy storage to provide electricity was pioneered in Germany when they used their underground cavern in Huntdorf to discharge 290,000 kW for 2 hours. Later, a cavern in McIntosh, Ala. was used to discharge 110,000 kW for 26 hours. These systems used night time loading of their compressors to pressurize their cavern and then discharge their pneumatic energy (with the combustion of fuel added to the pressurized air) as electricity during the daytime. The idea was to use inexpensive power at night and sell the power during the daytime at a higher price.

More recently, the underground cavern energy storage concept has been explored in Ohio where the discharge power was supposed to be 2,700,000 kW for the same purpose as Huntdorf and McIntosh.

The Iowa underground cavern was supposed to support 270,000 kW but built to provide power when the winds abated at a wind farm. Both of these projects were abandoned because of geology of the cavern was found unacceptable.

The New York 300,000 kW system is going ahead with their system. They also explored the feasibility of a 3 feet diameter and 2 miles long pipe that generated 10,000 kW for 2 hours of discharge.

All these projects used the compressed air in combination with fuel combustion in their turbines to generate electricity. There is thus the generation of a carbon dioxide plume. Thus, there is the need to recover the waste heat from the nearly 1,000° F. exhaust.

There are chemical batteries (Lead-Acid, Sodium Sulfide, Lithium-Ion) that have been stacked to achieve utility size power delivery. During their lifetimes of 5 to 15 years there are maintenance issues. After these operational years, the entire system requires replacement.

The Battery Energy Storage System (BESS) for Golden Valley Electric Association, with funding of $35 million, delivered the following power and discharge times:

27 MW of power for 15 minutes*
13,760 liquid electrolyte-filled NiCad cells
Each battery is roughly the size of a large PC and weighs 165 pounds
Total BESS weight—1,500 tons
Building measures 120×26 m.
Batteries have an anticipated life of 20-30 years

*It is important to note that the general requirement for other applications is discharge time of 4 hours (240 minutes) or more. Thus, the cost estimate would be increased 16-fold for the same power.

The limitations of the standard NiCd cells are:
Cadmium is a toxic metal. Cannot be disposed of in landfills
Relatively low specific energy compared with newer systems
Memory effect; needs periodic full discharges and can be rejuvenated
High self-discharge; needs recharging after storage
Low cell voltage of 1.20V requires many cells to achieve high voltage Redox flow batteries (RFB) represent one class of electrochemical energy storage devices. The name "redox" refers to chemical reduction and oxidation reactions employed in the RFB to store energy in liquid electrolyte solutions which flow through a battery of electrochemical cells during charge and discharge. Redox flow batteries offer an economical, low vulnerability means to store electrical energy at grid scale. Redox flow batteries also offer greater flexibility to independently tailor power rating and energy rating for a given application than other electrochemical means for storing electrical energy. Redox flow batteries are suitable for energy storage applications with power ratings from 10's of kW to 10's of MW and storage durations of 2 to 10 hours.

Based on the foregoing, there is a need in the art for a green community system which reduces utilizes compressed air storage and transportation for the generation of clean electricity and HVAC. What might be further desired is a green community system which utilizes the by-products of energy generation systems to reduce waste output.

SUMMARY OF THE INVENTION

A green community design is provided as a system. In an embodiment, the system is provided with air compressors in fluid communication with a transportable compressed air energy storage system (T-CAES) having one or more pressure vessels which receive compressed air from the air compressors. The pressure vessels of the T-CAES system may be underwater pressure vessels or under sea bed pressure vessels to increase efficiency of heat transfer.

A transfer line compressed air energy storage system (TL-CAES) is in fluid communication with the T-CAES system to receive compressed air and transport the compressed air. One or more turbo expanders are in fluid communication with the TL-CAES system and receive the compressed air and exhaust super-chilled air. The super chilled air can be used to provide HVAC for facilities and also to improve the efficiency of one or more natural gas electric generators. The natural gas electric generator sets of the community system can also provide electricity and HVAC to one facilities.

The air compressors of the green community system may be powered by a green energy source. The green energy source may be a wind turbine farm or a photovoltaic panel farm. Other green energy sources may also be used. In an embodiment, if the green energy sources are not providing enough energy to run all the air compressors in the system, then some air compressors may be shut off, such that the air compressors remaining in operation will operate at maximum efficiency.

In an embodiment, the green community system can be further provided with one or more companders which receive compressed air from the TL-CAES system. Purification towers are also provided and receive super chilled air from the companders. The purification towers purify waste water, which may be obtained from a mining pond or brackish water source. During the purification process, the purification towers exhaust chilled air. The exhausted chilled air may then be used to improve the efficiency of a natural gas electric generator set.

In an embodiment, the green community system may be provided with one or more companders which receive compressed air from the TL-CAES system and exhaust super-chilled air. The super-chilled air can treat gaseous waste exhausted from a coal fired power plant to separate carbon dioxide and water from the gaseous waste. The separated carbon dioxide can be captured as dry ice or pressurized to form liquid carbon dioxide. The liquid carbon dioxide can be used for waterless fracking, and the dry ice can be used to recover oil from an abandoned oil well.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

FIG. 2 is a flow chart showing all the beneficial processes the Transportable Compressed Air Energy Storage (T-CAES) system and the Transfer Line Compressed Air Energy Storage (TL-CAES) system, according to an embodiment of the present invention;

FIG. 4c shows the thermodynamic energy balance for a T-CAES system, according to an embodiment of the present invention;

FIG. 4d shows the thermodynamic energy balance for a T-CAES system, according to an embodiment of the present invention;

FIG. 4e shows the preferred dimensions for the compressed air storage vessel, according to an embodiment of the present invention;

FIG. 5b shows the thermodynamic energy balance for the pipeline, according to an embodiment of the present invention;

FIG. 5c is a diagram of the pipeline wherein there is a need to drive pneumatic tools, and/or supply HVAC, and/or supply electricity, according to an embodiment of the present invention;

FIG. 6a is an elevational side view of pressure vessel configured as floating barge, according to an embodiment of the present invention;

FIG. 10c shows the centrifuge efficiency of fine particles when subjected to a smooth bend rather than the tortured bend shown herein;

FIG. 18d illustrates the thermodynamic heat balance in a eutectic chamber, according to an embodiment of the present invention;

FIG. 18e illustrates the results of eutectic chamber operation, according to an embodiment of the present invention;

FIG. 20c is an illustration of the initiation of the mixing process between the impacting solid frozen CO2 cylinders and warm viscous oil pool, according to an embodiment of the present invention;

DETAILED DESCRIPTION OF PREFERRED EMBODIMENTS

Figure 1:
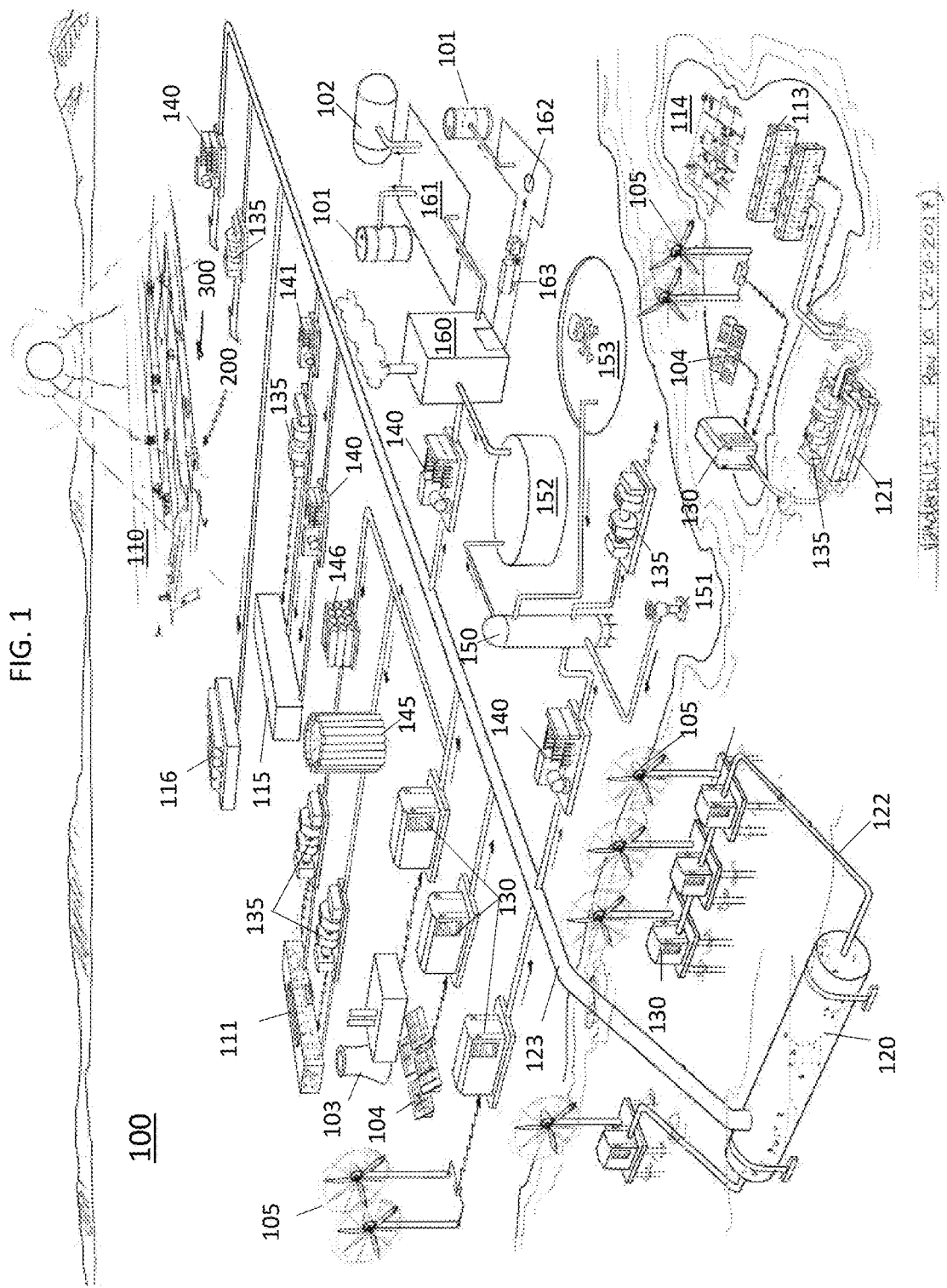
FIG. 1 is a perspective view of a green community system, according to an embodiment of the present invention.

Preferred embodiments of the present invention and their advantages may be understood by referring to FIGS. 1-21, wherein like reference numerals refer to like elements.

In reference to FIG. 1, a green community 100 is depicted. The green community comprises of a network of energy systems connected by a Transfer Line Compressed Air Energy (TL-CAES) system.

The center of the TL-CAES is a main steel pipe 123, which receives compressed air from electric compressors 130. In the preferred embodiment, the compressors 130 receive the required electricity for operation from natural and existing sources, such as wind farms 105, solar farms 104, and off-peak energy produced from existing power grids 103 and 160.

In a preferred embodiment, a Transportable Compressed Air Energy Storage (T-CAES) system supplements the TL-CAES system of the green community. The T-CAES system is comprised of a pressure vessel 120 or 121 or 145 or 146. In a preferred embodiment, the pressure vessel 120 is located offshore and under the seabed, to provide for optimal heat exchange for the system. The pressure vessel 120 is supplied with compressed air from electric compressors 130 via a system of smaller pipes 122. In the preferred embodiment, the electricity to run the compressors is supplied by local wind turbines 130.

In the off-shore version of the T-CAES system the pressure vessel can be constructed of inexpensive materials that are not required to store or transfer heat energy, only the capability to safely contain the air pressure. The required heat source is the entire ocean or other body of water and the connection to this heat source is the bare steel pipe that connects the pressure vessel to the turboexpander intake port. The typical 3- to 4-inch diameter bare steel pipe need not be so thick to contain the typical 200 psig air pressure feeding the turboexpander and only typical 100 to 300 feet lengths are required to assure that a near constant air temperature is fed to the turboexpander even though the air temperature in the insulator walled (say, reinforced concrete) pressure vessel provides lower and lower air temperatures as it exhausts its supply of air. The input air from the pressure vessel can be extremely low but the heat transfer from the water to the air inside the 100 to 300 feet long pipe is sufficient to assure a near constant air temperature to the turboexpander.

Facilities such as a data center 115, can benefit from the distribution of the TL-CAES system, wherein the main pipe feeds into a one- or two-stage large compander 140. The compander then creates a supply of cold air to provide an HVAC system for the data center. In another embodiment, a small one-stage compander 141 may be coupled with turbine generator set 135 to provide the data center 115 with electricity with reduced consumption of natural gas.

For facilities such as a hotel 111, which experience significant changes in the rate of energy consumption throughout the day, the compressed air of the main pipe 123 can first be feed into vertical manifold 145 or horizontal manifold 146 pressure vessels. The pressure vessel structures can store compressed air to be tapped into during peak consumption hours. During off-peak hours, the manifold pressure vessels can be filled by the TL-CAES system.

For facilities, such a remote hotel 111, and the main pipe 123 is too far, a local wind farm and/or a local photovoltaic panel farm can be used more economically to feed either vertical manifold 145 or horizontal manifold 146 pressure vessels of a T-CAES system to provide electricity and HVAC.

The green community concept can also be applied on a smaller scale. In an embodiment, an island 114 base with typical facility 113 can be supplied with HVAC and electricity provided by a floating turboexpander/generator set 135. In the island embodiment, the turbine generator set 135 will receive air supplied by a floating pressure vessel 121. In a preferred embodiment, the turbine generator set can be provided offshore, atop the floating pressure vessel. The floating pressure vessel 121 will be filled by a compressor 130 which runs off of power supplied by a solar farm 104 or wind farm 105.

The buoyant properties of the pressure vessels and the robust properties of the pressure vessels permit these vessels to serve as the barge structure itself. Thus, the costs of the barge and of the barge buoyant system are now replaced by the cost of the pressure vessel. This provides the most economical version of the T-CAES system.

FIG. 2 shows all the beneficial processes, besides the generation of electricity, that become available because of the Transportable Compressed Air Energy Storage (T-CAES) system and the Transfer Line Compressed Air Energy Storage (TL-CAES) system. The T-CAES and TL-CAES systems, unlike their underground cavern energy storage systems, do not burn fuel. The turbine exhausts expanded air initially at plus 70-degrees Fahrenheit, not expanded combustion gases that were at the high temperature limits, causing the loss of strength in their turbine blades. Turboexpander impeller wheels operating at cryogenically cold gas temperatures have no corrosion issues even when in the field for more than 50 years. It is this high mass flow of super chilled air at about minus 175-degrees Fahrenheit exhausted from the two-stage turboexpander that provides all the processes shown underneath the line which separates the existing technology from the innovative technology of the present invention.

In reference to FIG. 2, the interrelated technologies are shown in a flow diagram to represent interactions in a green community system. Each technology could be used on its own to contribute to the community energy system. In the embodiment shown in FIG. 2, a community already has existing sources of power 103 or 160, such as carbon-based fuel plants, natural gas plants, wind power, or solar power. Power from existing sources may be stored in a pressure vessel manifold of a conventional compressed air storage system (T-CAES) 145 or 146, or it may enter an innovative system 123, described herein, comprised of innovative technologies from EnisEnerGen LLC which depend upon the T-CAES and TL-CAES systems. In special cases, where only smaller air mass flow rates are required and the capital investment for a T-CAES or TL-CAES systems are not appropriate, a commercial compander is used to generate the high mass flow of super-chilled air, but without any generation of electricity from the compander.

Figure 3A:
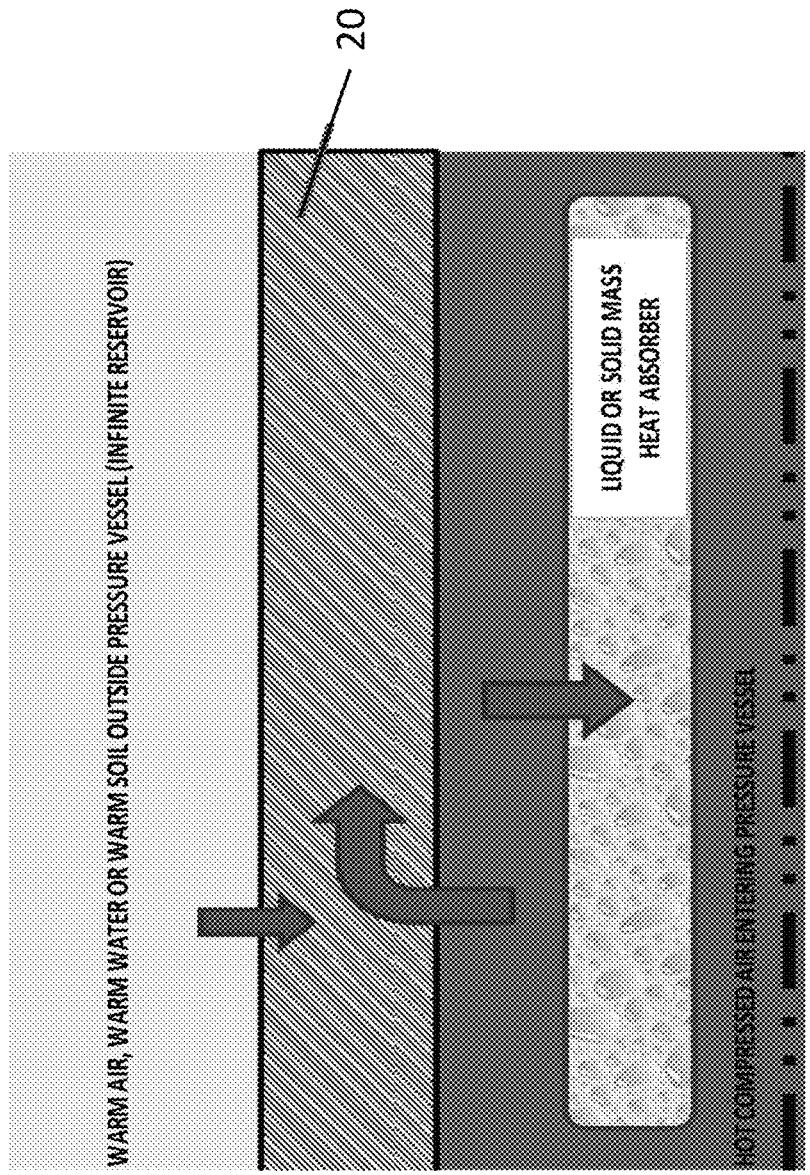
FIG. 3a is a heat transfer diagram of the T-CAES and TL-CAES systems, according to an embodiment of the present invention during the compression phase of the pressure vessel operation.

In reference to FIG. 3a, the T-CAES system is shown wherein the heat exchange is taking place as the thick steel walled pressure vessel 20 as it is filled with hot compressed air. Recall that these walls were cooled during the previous operational stage where the air was exhausted. In an embodiment, wherein the pressure vessel 20 is placed above ground, the pressure vessel will require strong contact with warm soil, warm water in addition to the exposure to warm ambient air. Thus, after each complete cycle of air release and air intake from the pressure vessel, the wall temperature returns to its initial value.

In an embodiment, wherein the pressure vessel 20 is placed below ground or underwater, the pressure vessel 20 will require minimum contact with the environment, and may be constructed from a more insulative material, such as reinforced concrete.

Figure 3B:
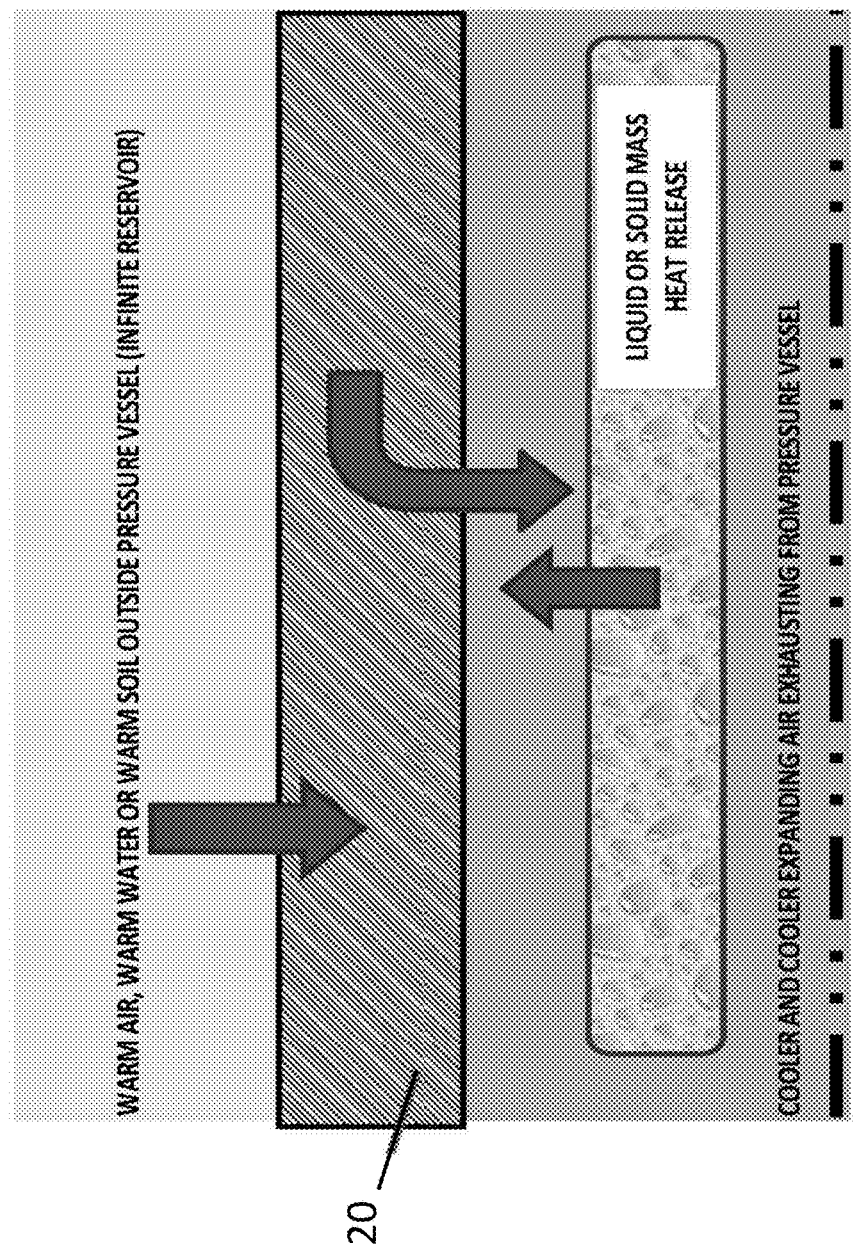
FIG. 3b is a heat transfer diagram of the T-CAES and TL-CAES systems, according to an embodiment of the present invention during the expansion phase of the pressure vessel operation.

In reference to FIG. 3b, the T-CAES system is shown wherein the heat exchange is taking place as the thick steel walled pressure vessel 20 is exhausting cooler expanding air. In an embodiment, wherein the pressure vessel 20 is placed above ground, the pressure vessel will require strong contact with warm soil, warm water as well as exposure to warm ambient air.

In an embodiment, wherein the pressure vessel 20 is placed below ground or underwater, the pressure vessel 20 as it exhausts its air will require only that about 100 to 200 feet of pipe length of exhaust pipe be in contact with the environment to provide the required heat transfer to the air supplied to the turboexpander. Thus, the pressure vessel may be constructed from a more insulative and inexpensive material, such as reinforced concrete.

Also, note that a fluid mass has been introduced into the center of the pressure vessel to increase the heat capacity of the pressure vessel as well as provide rapid increase and decrease of the heat content of the fluid contained in tubing. Thus, when hot air is introduced into the pressure vessel from the final stage of the multi-stage compressor the fluid mass captures this heat. And when the pressure vessel exhausts its air and the remaining air tends to get cooler and cooler, the fluid mass releases the capture heat.

Figure 4A:
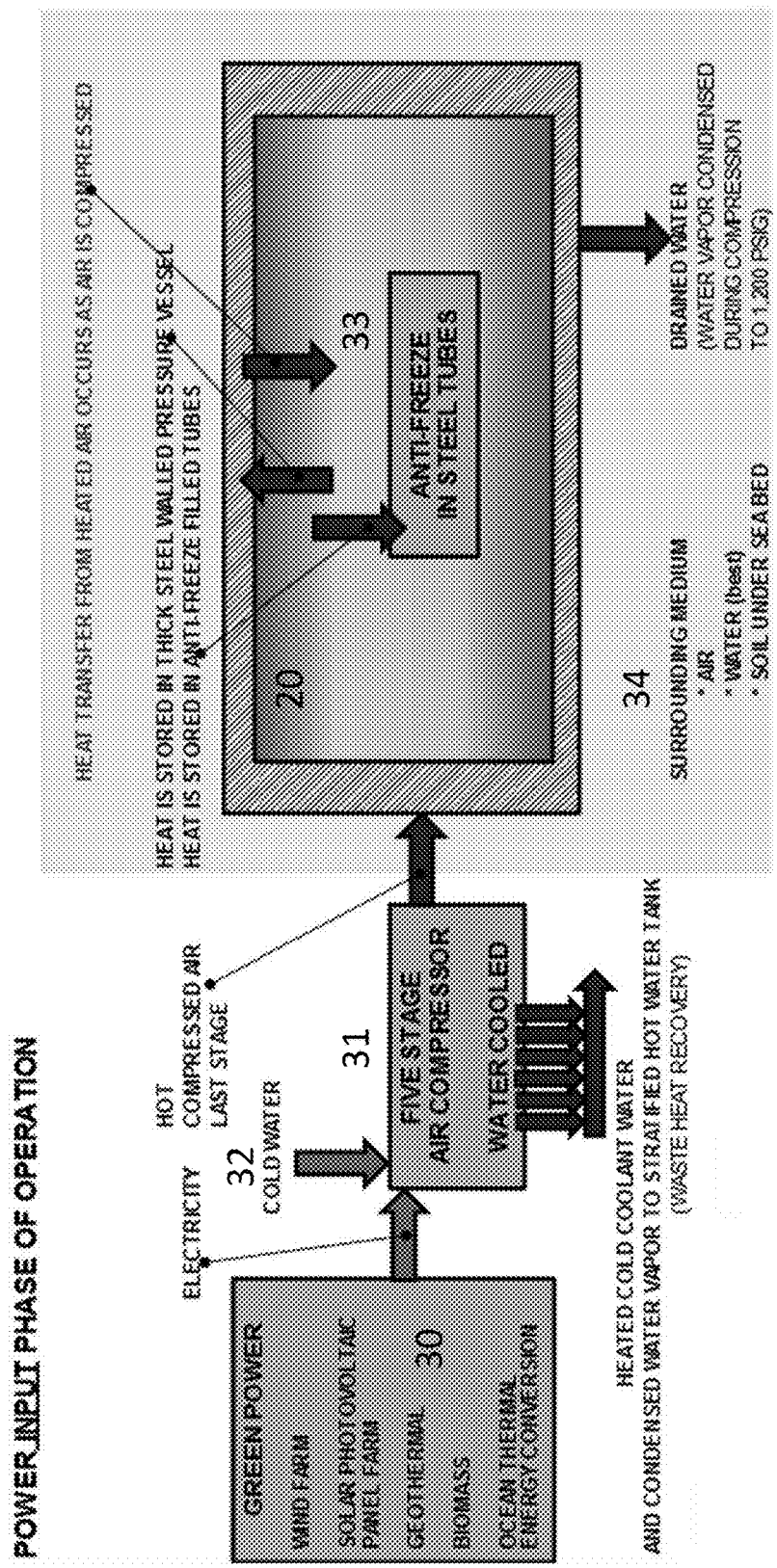
FIG. 4a is a flow diagram of the typical 20-hour long air compressor operation, according to an embodiment of the present invention.

FIG. 4a shows the typical 20-hour long air compressor operation. The typical 1,200 psig air compression process not only raises the air pressure but also removes water vapor from the air so that outputs are: high pressure dry air, hot condensed water between compressor stages and hot water generated by the compressor waste heat heating the coolant water. The last stage of compression introduces hot air into pressure vessel.

Also, note that a fluid mass has been introduced into the center of the pressure vessel to increase the heat capacity of the pressure vessel as well as provide rapid increase and decrease of the heat content of the fluid contained in tubing. Thus, when hot air is introduced into the pressure vessel from the final stage of the multi-stage compressor the fluid mass captures this heat. And when the pressure vessel exhausts its air and the remaining air tends to get cooler and cooler, the fluid mass releases the capture heat.

The T-CAES system is shown in an input phase of operation, wherein a green power supply 30 provides electricity to power a five-stage air compressor 31. The air compressor is cooled with a supply of cold water 32 recovered by a tank. The air compressor 31 then pushes hot compressed air is compressed into the pressure vessel 20. In the preferred embodiment, the pressure vessel is compressed to 1200 PSIG. In an embodiment, the pressure vessel is further comprised of anti-freeze filled tubes 33 to store heat. In the preferred embodiment, the medium surrounding the pressure vessel 34 is water, but may be air or soil. Excess water 35 created during compression is drained from the vessel, and may be recovered and repurposed.

The air compressor operation is typically 20 hours long. The typical 1,200 psig air compression process not only raises the air pressure but also removes water vapor from the air so that outputs are: high pressure dry air, hot condensed water between compressor stages and hot water from coolant water. The last stage of compression introduces hot air into pressure vessel.

Figure 4B:
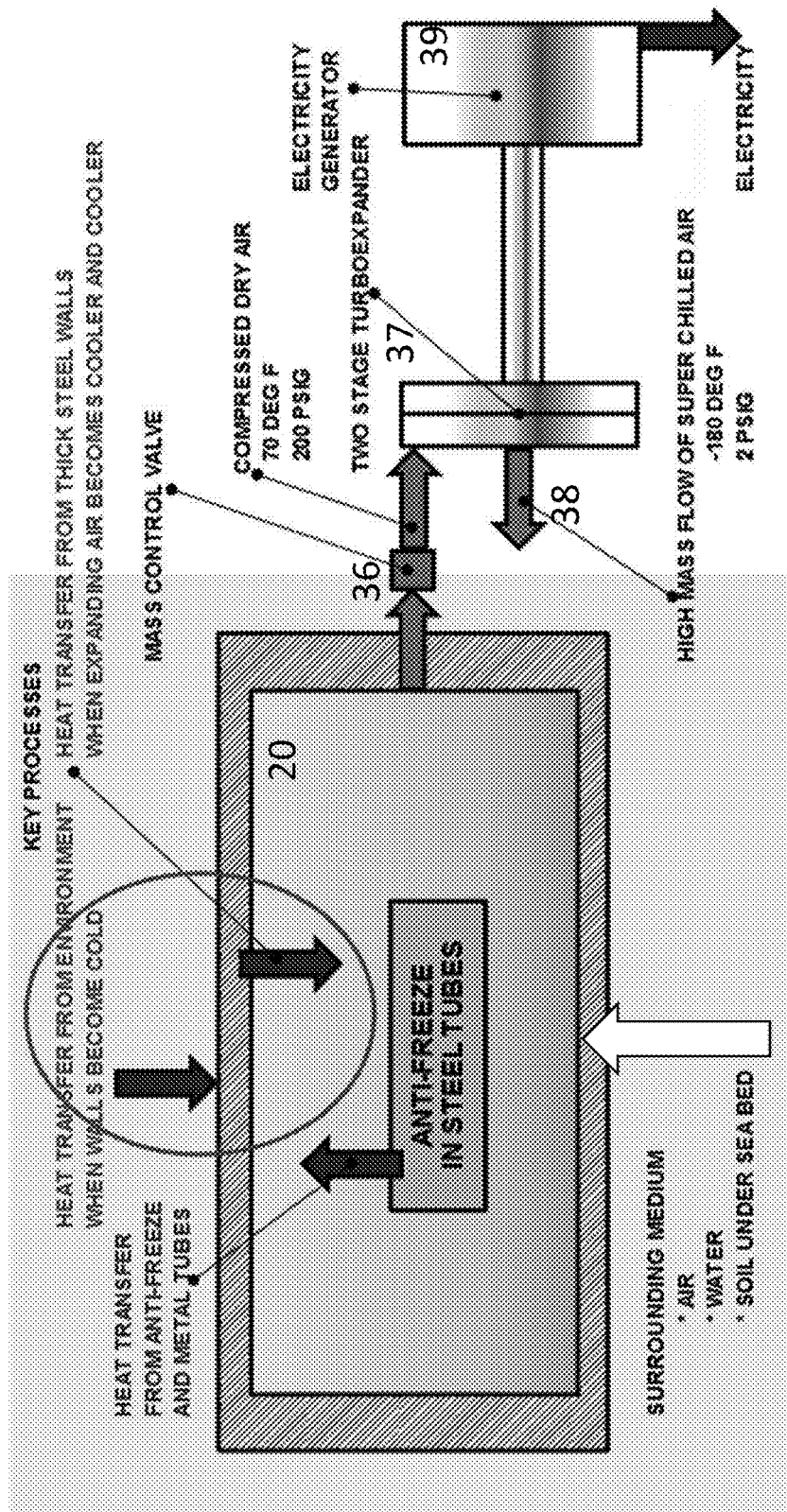
FIG. 4b is a flow diagram of the typical 4-hour long air exhaust operation, according to an embodiment of the present invention.

In reference to FIG. 4b, the T-CAES system is shown in an output phase of operation, wherein the pressure vessel 20 exhausts cooler expanding air regulated by a mass control valve 36 to a two-stage turbo expander 37. The expander 37 emits a supply of high mass flow of super chilled air 38, preferably at minus 180-degrees Fahrenheit and 2 PSIG. Simultaneously, the expander 37 turns the turbine of an electric generator 39 to generate electricity.

The typical exhaust operation is a minimum of 4 hours. The drop in air temperature draws heat from the heat in the thick steel walled pressure vessel and internal mass of warm fluid stored in tubes inside the pressure vessel. But much of the heat also is drawn from the connections between the pressure vessel and the surrounding medium: air, soil in above ground applications, water in the below sea or lake applications or mud in the below seabed or lakebed applications. Thereby, the air (at constant mass flow input) input temperature to the turboexpander remains above 40-degrees Fahrenheit.

FIG. 4c shows the thermodynamic energy balance for a T-CAES system composed of a 12,000-kW air compressor (driven by utility, wind, solar or other green source), pressure vessel size required to contain the input air from the air compressor over a period of 18 to 20 hours, and turboexpander/generator set that will deliver 6,000 kW of electricity and 6,000 kW of thermal power. Note that the exhaust from the pressure from the pressure vessel to the turboexpander input port is 200 psig for duration of 6 hours that exceeds the minimum requirement for 4 hours.

The power source from a solar photovoltaic panel farm that delivers power during daytime will drive the compressor for only 6 hours so that electrical power and HVAC delivered during the night time will use the same formulation except for different input values to assure more energy is available than is required. Thus, larger solar photovoltaic farms are required to satisfy the presented calculations.

The calculation also assumes that a turboexpander/generator set is used. However, if only HVAC is required, a "compander" (i.e., turbocompressor loaded turboexpander coupling that is free-spooling, single or double stage). This system only supplies a high mass flow of super chilled air but does not supply electricity.

FIG. 4c shows the selection of 1,200 psig as the air pressure in the pressure vessel. This not only stores all the required mass of air in a small foot-print but also drains the water from the intake air with relative humidity (RH). Consider that at 100% RH the ambient (14.67 psia and 75° F.) intake air contains 0.0200 pounds of water for each pound of air. At 1214.67 psia, 75° F. and 100% RH, the pressure vessel will absorb only 0.0003 pounds of water for each pound of air. Thus, there will be 0.0197 pounds of water for each pound of air drained. Consider the pressure vessels will contain more than 2,164,000 pounds of air so that 400 pounds of water will be drained for use each day.

The drainage of water is important for a later important function. We will be freezing the remaining very low RH air in its traverse through the first stage of the two stages of its expansion through the turboexpander turbine blades. The usual turboexpander design requires caution here. However, the turboexpander designed by Lance Hays has no issue here.

Note that 18 hours of 12,000 kWe power delivered to the compressor(s) for 18 hours results in later discharge of 6,000 kWe and 6,000 kW thermal for 6 hours.

The 18 hours of pressure vessel filling with compressed air also requires a parallel flow of heat transfer from the surroundings through the pressure vessel supports and into the pressure vessel wall to assure that the chilled vessel, resulting from completed exhaustion of its specified air, returns to ambient temperature. The FLUENT code contained within ANSYS will assure that the support structure of the pressure takes full advantage of the environment (soil, water and air) to deliver the required heat.

A compressor operates best when supplied the full electrical power and operates at lower efficiency when driven by partial electrical power. Wind turbines operate at full power at 25% to 30% of the time at rated power. Therefore, it is best to use four air compressors so that when full wind power is available all compressors operate at full efficiency. However, when the wind speed abates and only some electrical power is available it is best to direct that input electrical power so that the optimum number of compressors operate.

The 72,000 kW-Hr T-CAES system supports a huge hotel or resort building that has a parking lot that can support a large manifold of pressure tanks contained in an unsightly structure. However, FIG. 3c calculation template is useful to describe a 4-hour discharge of 1,250 kWe and 1,250 kW thermal (10,000 kW-Hr) system so that 7-fold reduction in tanks to 13 tanks from the 92 individual tanks, are used and occupy a small area in a parking lot.

When the T-CAES system is used, it is mandatory to supply at least 4 hours of power discharge to defeat the peak power load. In some Time-of-Use (TOU) rate schedules there are rates for peak hours, mid-peak hours and off-peak hours. There are the usual prices assigned to hourly kW-Hr usage but there is the penalty price assigned to the peak KW power used during each month. In addition, there are other prices listed in the electric bill. It is necessary to match the T-CAES system and the local utility TOU to assure reasonable payback periods.

It is important to note that their economies of scale for the turboexpander/generator set and for the compander. As the number of specific turbines is increased so is the price reduced. A ten-fold increase in the number ordered can result in a four-fold decrease in price. So too, as the power level is increased the price is reduced.

The economies of scale are less when ordering lengths of steel pipe and high pressure, five-or-six stage air compressors delivering 1,200 psig. There is some reduction in price when ordering a multitude of pressure vessels and air compressors delivering 1,200 psig. The price of the selected steel and copper are the dominant factors.

FIG. 3d shows the increase in air pressure from 200 psig to 300 psig delivered, resulting in a very small increase in the delivered electrical and thermal powers. In addition, the decrease in pressure vessel final air temperature after its exhaust is complete is higher in the pressure vessel when it exhausts from 1,200 psig to 300 psig instead of 1,200 psig to 200 psig. This reduces the need to deliver heat from the surroundings into thick-walled, steel, pressure vessel. This result is because the temperature in the remaining air is colder when the pressure vessel exhausts more of the air so that lower air pressures and lower air temperatures result.

It is the thick-walled, steel, pressure vessel that stores the delivered heat from the ambient (soil, water and air) environment as well as delivers that heat to the compressed air as it exhausts and cools during air expansion. The thick-walled steel vessel is used herein as an example of attachment of pressure vessel to high mass reservoirs of fixed temperature using excellent thermal conduction paths have the same effect.

The heat exchange from the steel wall into the denser air at 300 psig is more efficient than at 200 psig. Thus, 300 psig appears to have the above three advantages.

The operation of the 200-psig turboexpander is less stressful on the turboexpander casing. So, in this design we selected 200-psig. However, 300-psig is a consideration that each vendor decides as to what the vendor offers.

FIG. 4e shows the effects of wall thickness and final exhaust pressure of the pressure vessel on the final temperature of the air when the exhaust process is completed. Furthermore, the preferred dimensions and details of the pressure vessel and steel pipe are given.

Figure 5A:
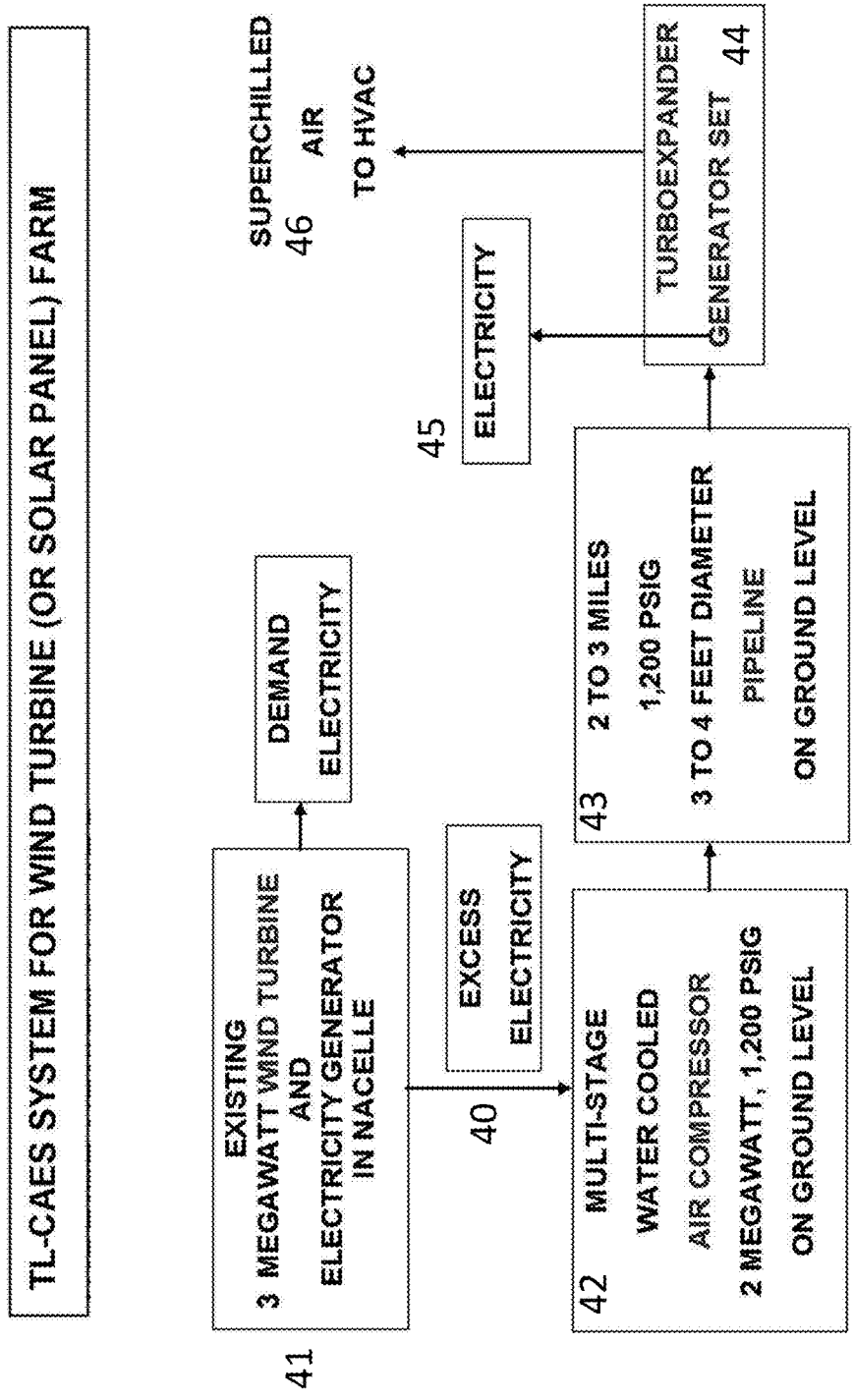
FIG. 5a is a flow chart for the TL-CAES operation, according to an embodiment of the present invention.
Figure 5D:
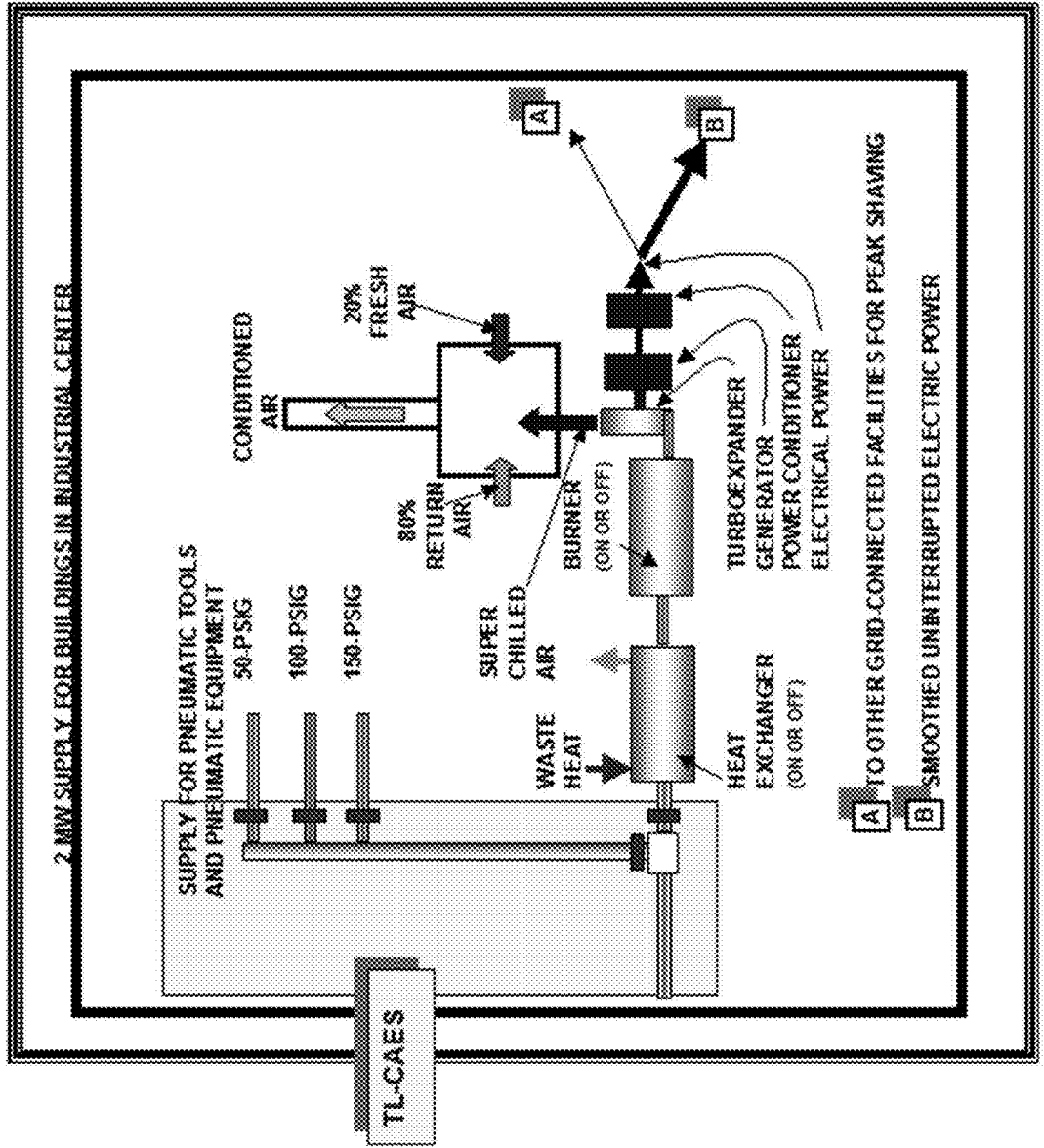
FIG. 5d is a diagram of a system site wherein there is a need to supply a building electricity, HVAC and source for pneumatic tools, according to an embodiment of the present invention.
Figure 6B:
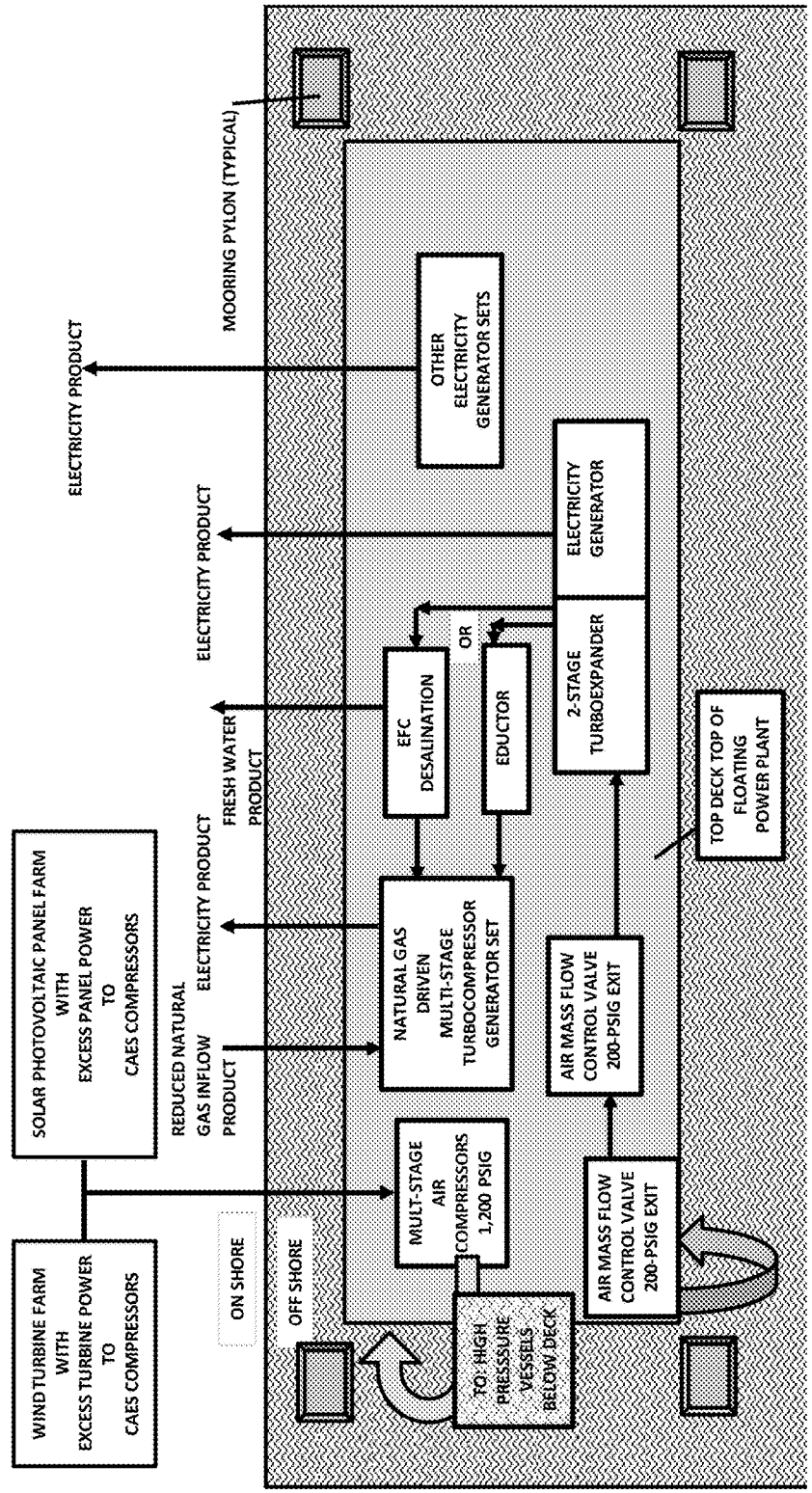
FIG. 6b is a diagram illustrating all the applications that can be supported by the floating pressure vessel barge, according to an embodiment of the present invention.

In reference to FIG. 5a, a flow diagram of the TL-CAES system is shown, wherein excess energy 40, from an existing power supply 41, preferably a wind turbine or solar panel far, is communicated to an air compressor 42. The compressed air is feed through a pipeline 43 until it reaches a local turboexpander and generator set 44 to supply electricity 45 and super chilled air 46 to a local station.

In the diagram presented in FIG. 5a, a typical 3 (or more) megawatt wind turbine continuously supplies electrical power to its users but whenever there is sufficient excess power it powers a 2-megawatt air compressor. The air is compressed in a pipeline that extends several miles. At the end of the pipeline there is a turboexpander/generator set that provides both electricity and a high mass flow of electricity. The pipeline serves several functions: pressure vessel, energy transfer (that replaces the need for high voltage power lines) and heat absorption of solar thermal energy. This concept works especially well when one considers 10 to 50 MW power requirements, several-hour long discharge times and desert sites with high solar insolation.

The TL-CAES system is key to not only supplying the basic electricity to the green community but also the high mass flow of super-chilled air for all the other applications involving water purification, mineral recovery, waterless fracking and oil recovery from abandoned oil wells. It will be driven by such green energy sources as wind and solar. The TL-CAES system operates effectively in the range of 10 to 50 megawatts.

The other most important function of the TL-CAES system is that it not only stores energy but transfers energy. Instead of the green community requiring distribution of its electricity via high tension power lines supported by angle-iron towers along a swath of land bordered by fences, we have 3 to 4 feet diameter pipeline spread throughout the green community. This arrangement replaces unsightly and highly visible electrical power lines with almost unseen pipeline at ground level.

When there is a forest to be traversed the high voltage power lines are subjected to wind damage that causes power lines to break and set forest fires, especially in drought stressed communities. On the other hand, the thick-walled pipeline of the TL-CAES system is not subject to this threat and if ever impinged upon by a robust incident, fresh air is released.

Once the main pipeline is in place around the community smaller pipelines branch out to individual users for their electrical, HVAC, pneumatic power tools and other applications.

The long pipeline, when crossing long spans exposed to the thermal irradiation from the sun, is recoverable as additional electrical power output from the GenSet.

The TL-CAES system will connect the 3 to 60 miles away utility-sized wind or solar farm with the green energy community. This TL-CAES system reaches out to existing power plant sites to capture and sequester the $CO_2$ emissions as well recover water from the emissions. When this $CO_2$ capture is near a fracking site or an oil well site the captured $CO_2$ will not only be sequestered but help in recovering fuel for the power plants already in-place. These activities will avoid creation of earthquake threats where they did not occur before as well not threaten poisoning of the water aquifer.

With reference to FIGS. 3-6, the concepts of the T-CAES have been encapsulated in the EnisEnerGen issued U.S. Pat. Nos. 6,927,503, 7,067,937, and 7,250,691 as a "method and apparatus for using wind turbines to generate and supply power to locations remote from the power grid." The concepts of "coordinating and stabilizing the delivery of wind generated energy" have been captured by U.S. Pat. Nos. 6,963,802, 7,308,361, and 7,974,742. The "method and apparatus for storing and using energy to reduce the end-user cost of energy" has been captured by U.S. Pat. No. 7,155,912. The "wind turbine station and tower with vertical storage tanks" method has been captured by the U.S. Patent Publication 2017/0074248, and a "method and apparatus for using solar energy to enhance the operation of the energy storage system" has been captured by U.S. Pat. No. 8,024,928.

The TL-CAES system has been captured by U.S. Pat. Nos. 7,502,739 and 7,755,212 which detail and claim a "method of transporting and storing wind generated energy using a pipeline".

There are island scenarios where frequent violent storms shut down operations at electrical power plants and at waste water treatment plants for a period of days and weeks. The Floating T-CAES system, shown in FIG. 6A-6C, fulfills all the electrical and water power needs of this community.

There needs to be well placed robust wind turbines and/or robust solar photovoltaic panel farms properly placed to assure that this green community is available to the Floating T-CAES system. Furthermore, the system must consider the shoreline depths and hazards of the natural rivers and sea shore inlets to accommodate this system.

Ideally, when all utilities are operating, the Floating T-CAES system will be operational at a useful site so that it is always working . . . storm or shine.

For the small island scenario where usable land area is scarce, the small footprint of a wind turbine on land a Floating T-CAES system is the answer. There are many such navy facilities.

The key advantage of the barge is that it not only provides portability but also cost savings. The highest cost item in the T-CAES system is the manifold of high pressure, thick-walled, steel pressure vessels. However, when constructing the barge itself for floatation it is necessary to invest in a steel platform for the barge. Thus, the funds for this steel platform can now be shared with the Floating T-CAES system. The system is used in 1 to 10 MW scenarios requiring 4-hour discharge times.

The floating T-CAES system has been captured by U.S. Patent Publication 2014/033069 "method and apparatus for integrating on-shore green and other on-shore power sources with a compressed air energy storage system on a floating power plant."

Figure 7:
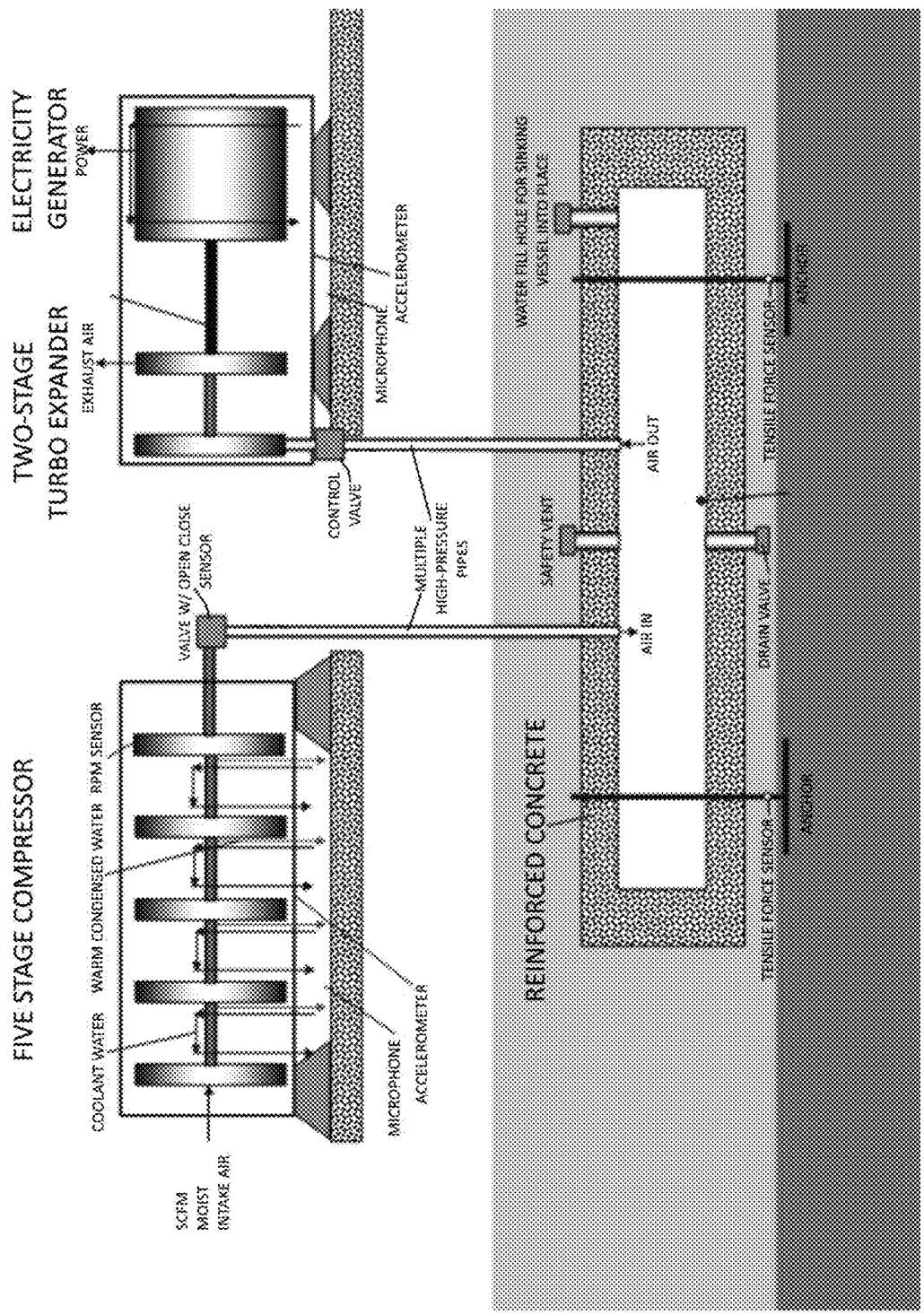
FIG. 7 is a diagram of the underwater T-CAES system, according to an embodiment of the present invention.
Figure 8:
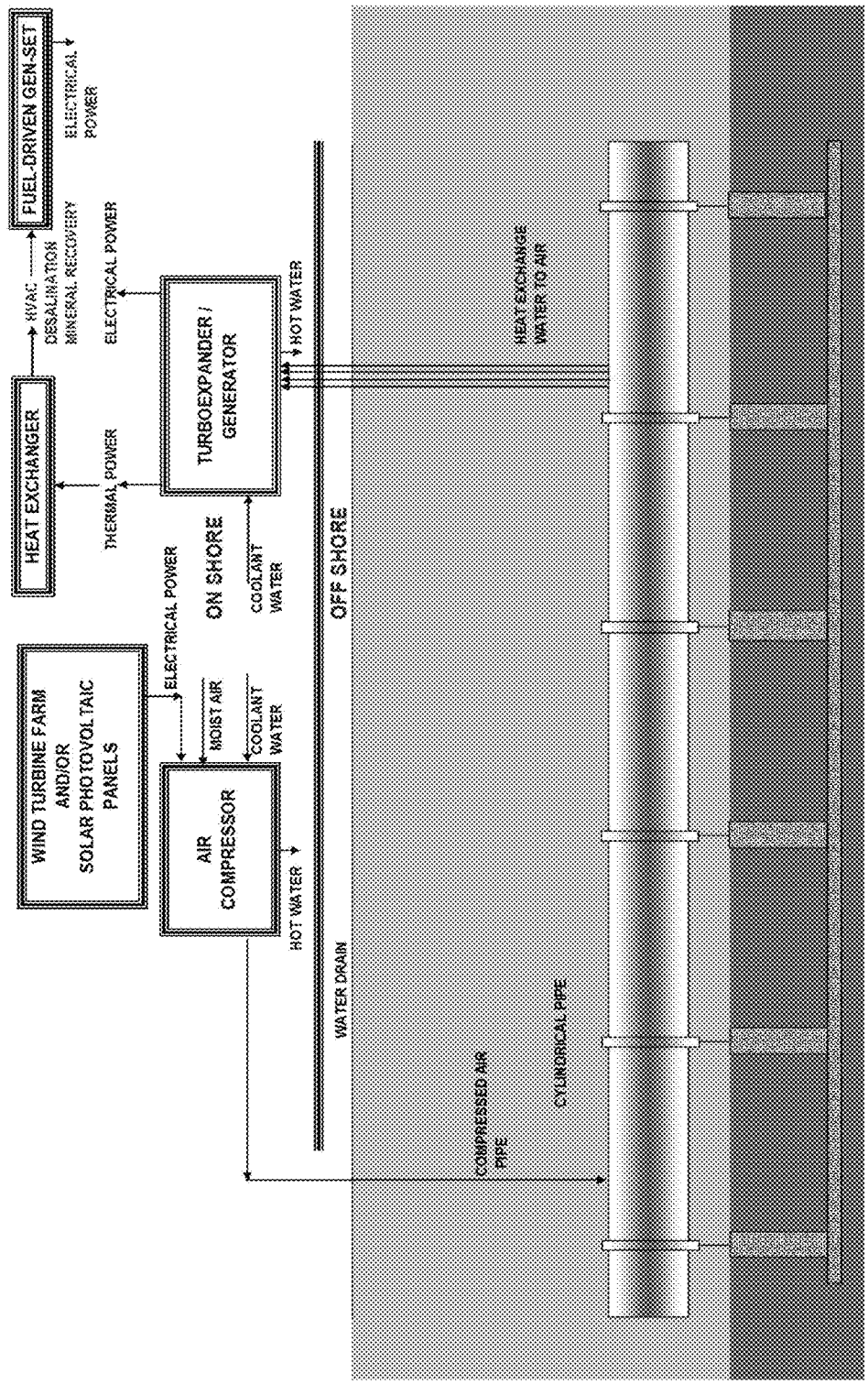
FIG. 8 is a diagram of the sea floor or under sea floor TL-CAES system, according to an embodiment of the present invention.

In scenarios identical to the Floating T-CAES system the underwater and under seabed T-CAES systems, as shown FIGS. 7-8, applies.

Although these facilities are fixed by their very construction, they save valuable sea side shoreline real estate. The system is used in 1 to 10 MW scenarios requiring 4-hour discharge times. Like the Floating T-CAES system, multiple systems can be combined to supply either more power or longer discharge times.

When the pressure vessel itself is underwater, and the pressure vessel is comprised of thick steel walls, the contact of the water with the pressure vessel outer walls assist in reducing the temperature drop in the air contained within the pressure vessel as it exhausts its air during its pressure drop. This is especially convenient in the scenario wherein the pressure vessels are cylinders under the floating floor of a barge so that the pressure vessels comprise not only the floatation system and robust structure of the barge but also serve as the compressed air storage system.

When the pressure vessel itself is underwater or under the seabed, and the pressure vessel is comprised of non-thermal conductive and non-thermal capacitive walls, the contact of the water and the steel pipe between the exit port of the pressure vessel and the input port to the turboexpander needs to be in contact with the water to assure that constant air temperature is delivered to the turboexpander as the pressure vessel exhausts its air. The same steel pipe need be extended so that it has contact with the thin steel liner inside the pressure vessel to assure that the fully pressurized pressure vessel always starts at near or above ocean temperature.

This configuration applies to parts of the green community that are more remote from the main community and have little land space for commercial or residential power but located near a shoreline.

The underwater T-CAES system has been captured by U.S. Patent Publication "method and apparatus for using wind energy or solar energy for an underwater and/or under seabed compressed air energy storage system.

Figure 9:
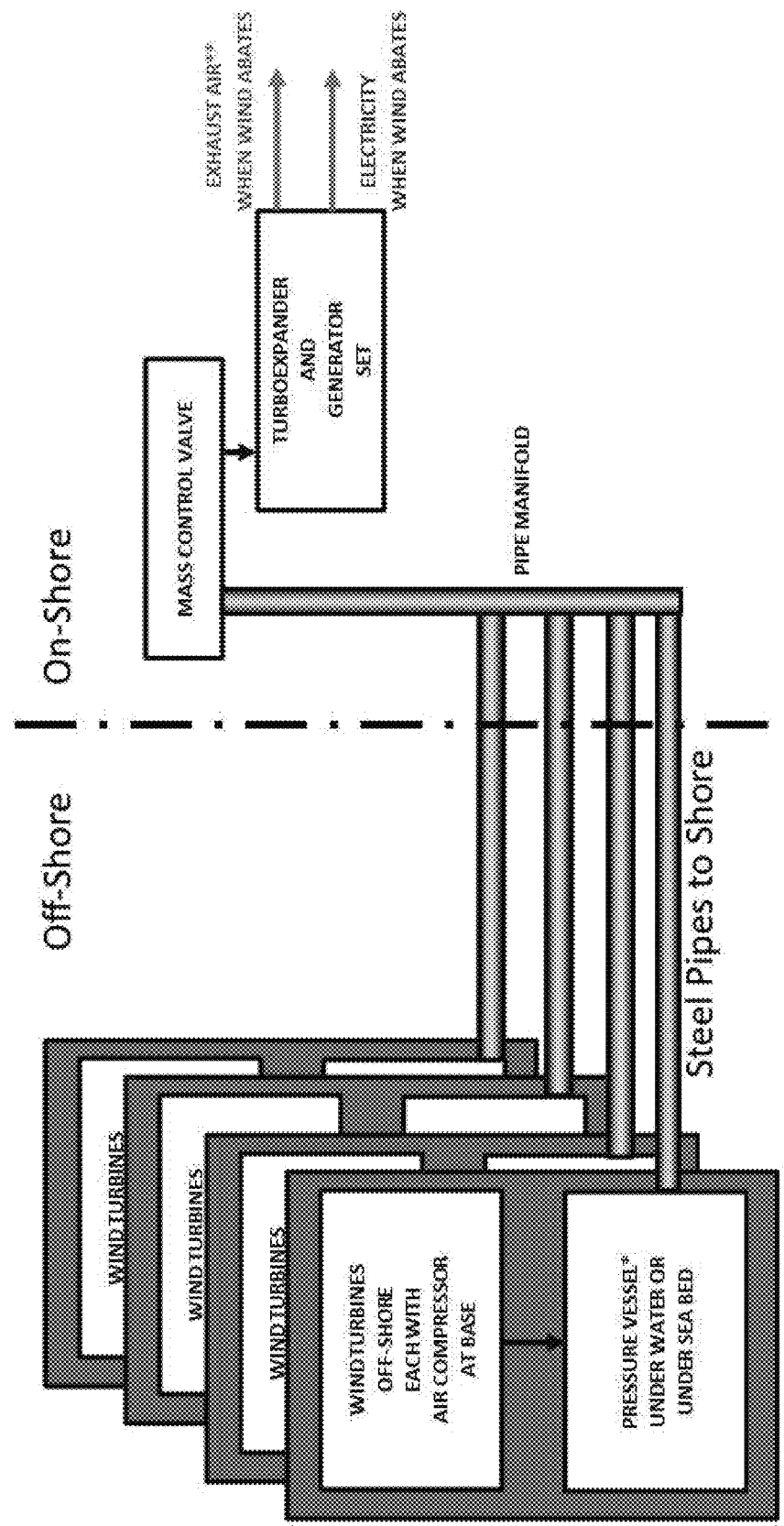
FIG. 9 is a diagram of the offshore wind farm, according to an embodiment of the present invention.

In reference to FIG. 9, an offshore system of T-CAES and TL-CAES Systems and Off-Shore Wind Turbine Farms is shown. The U.S. Navy requested bidders to supply compressed air energy storage systems for application in their harbors. One responder offered balloon-like structures for the containment structure.

There was concern expressed that the heavy traffic of military vessels that have their keels extending deeply down in the water posed a problem for the high floating balloon structures. Also, the constant pressurization and depressurization of fabric-like materials brought into question maintainability, repair rate and lifetime before required replacement.

At the time the authors herein offered two alternate pressure vessel concepts. Each concept offered a reinforced concrete pressure vessel. One located just above the seabed floor and for the applications in shallower water. The other concept used a reinforced concrete pressure vessel located below the seabed floor.

The sea or lake is an environment that is advantageous to the T-CAES system or TL-CAES system because of the near constant temperature of the water, the infinite reservoir of heat and the excellent heat exchange properties between the liquid water and the outer surface of a metal pipe. There is only 100 feet length of a 4-inch diameter steel pipe with about 200 psia internal air pressure needed to assure that the air supplied to the turboexpander/generator set would be sufficiently constant to attain the specified performance . . . and without burning fuel.

Similarly, the availability of the surrounding water to supply need heat transfer into the interior of the reinforced concrete pressure vessel was simple, especially in the case wherein the pressure vessel already has a large internal mass of tubing filled with anti-freeze. It is energy efficient to pump water rather than air. Thus that pumping external water from the infinite heat reservoir into a small portion of the interior of the reinforced concrete vessel is also efficient when deemed necessary.

The reinforced concrete pressure vessel of the T-CAES and TL-CAES systems certainly met all the robust requirements of a navy scenario. Furthermore, all the other key hardware (compressor and turboexpander/generator set) have lifetimes of more than 50 years with proven maintenance and repair records generated by equipment in the field that are that old. The special characteristic of the turboexpander longevity is that is processes air at temperatures starting at room temperature and dropping down to minus 175° F. so there are no corrosion issues associated with hot combustion gases on turbine blades.

The coupling of the T-CAES or TL-CAES system to a wind turbine farm would make this configuration a completely green system . . . no fuel would be used.

In 2011 there was a detailed discussion involving CAES and support of off-shore wind turbines. The work was supported by the National Science Foundation under grant number EFRI-1038294 and the University of Minnesota, Institute on the Environment, Initiative for Renewable Energy and the Environment (IREE) grant RS-0027-11.

While this work effort outlined the liquid piston CAES and open accumulator concept, much future work is required to realize this promising technology. Future work included modeling of the fluid dynamics and heat transfer within the liquid piston chambers. Beyond creating a balance between increasing the heat transfer and maintaining suitable viscous losses, design for suitable the cycle frequency and liquid-gas interface stability must be addressed. In addition, the kinematics, tribology, and machine design in the hydraulic transformer must be studied and designed for high efficiency across a large range of fractional displacements and for seawater operation. Finally, the overall system must be optimized for performance and efficiency and control methods must be developed. This system has the potential to provide a cost-effective, efficient, energy-dense, and power-dense energy storage system capable of performing in many environments, including the open ocean.

During 2017, the Fraunhofer Institute is planning to test a new storage concept in a German lake before the end of this year. The storage idea, which involves placing hollow concrete globes on sea or lake beds, resembles an underwater balloon technology already developed by Ontario, Canada-based Hydrostor. In reality, the two concepts are quite different, however.

While Hydrostor's balloons use water pressure to deliver a novel form of compressed air energy storage (CAES), the Fraunhofer project, called StEnSEA (Stored Energy in the Sea), is essentially a variant of pumped hydro.

Instead of a lower and upper reservoir, the system uses a pressure tank as a lower reservoir placed on the seabed at 600 to 800 meters. The water column above the entrance of the concrete sphere acts as an upper reservoir, without severe ecological and visible impact.

Eventually the German plan is to involve concrete structures.

Thus, the concept of CAES for off-shore application is now being considered in both the USA and Germany.

What is offered herein is a rugged system composed of off-the-shelf components with at least 50-year lifetimes.

In a green community that has the good fortune to be located at a shoreline where winds are available at a large distance from the shoreline, wind turbines at sea are an important element in maintaining a green communities clean air, In the northern part of Europe the Norwegians and Germans have understood this potential and intend to get rid of all their nuclear power plant and even progressively shut down their coal-fired power plants by using this scenario.

When there is a green community and there is use of multiple T-CAES systems in all the possible scenarios, the cost of several expensive components is reduced. The best example is the cost of the turboexpander systems can be reduced by factors of 2 to 5. Furthermore, there is the economy of scale where the cost per unit drops with increase in power level. Finally, there are the initial design costs that need not be repeated.

The availability of a high mass flow of cold and/or super cold air is not always available from a T-CAES system or TL-CAES system because of the capital investment required. The single-stage, free-spooling compander is ideal for the high mass flow of cold air and the two-stage, free-spooling compander is ideal for the high mass flow of super-cold air. These systems are useful to support green energy operations at sites remote from power transmission lines.

For example, a free-spooling, one-stage compander with an exhaust temperature of −22 degrees Fahrenheit is ideal for feeding a centrifuge to remove any ice particles before feeding the cold air to a Gen-Set, A free-spooling, two-stage compander with an exhaust temperature of −175 degrees Fahrenheit is ideal for feeding a water purification system followed by a centrifuge and a Gen-Set. In either case, no turboexpander generator set is needed to supply both electricity and cold air . . . only cold air is needed.

In application where shipboard water purification is required the two-stage, free-spooling compander feeding FCSC with updraft air from the compander will be used because of the shorter height of the chamber.

In application where outdoor water purification is required the two-stage, free-spooling compander feeding FCSC with downdraft air from the compander will be used because of the permitted available height of the chamber.

Figure 10A:
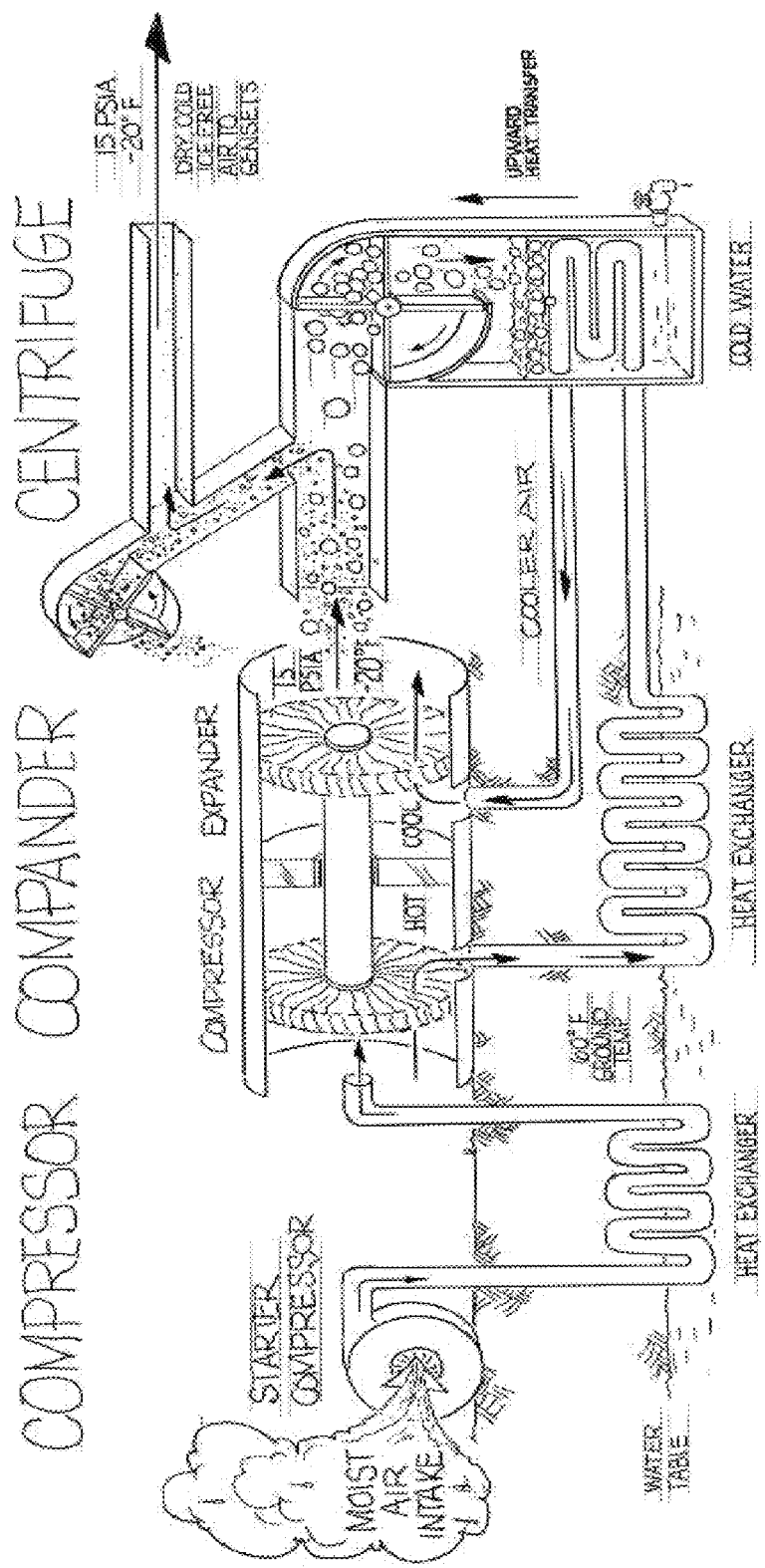
FIG. 10a is a cross-sectional view of the starter-compressor/compander/centrifuge system, according to an embodiment of the present invention.
Figure 10B:
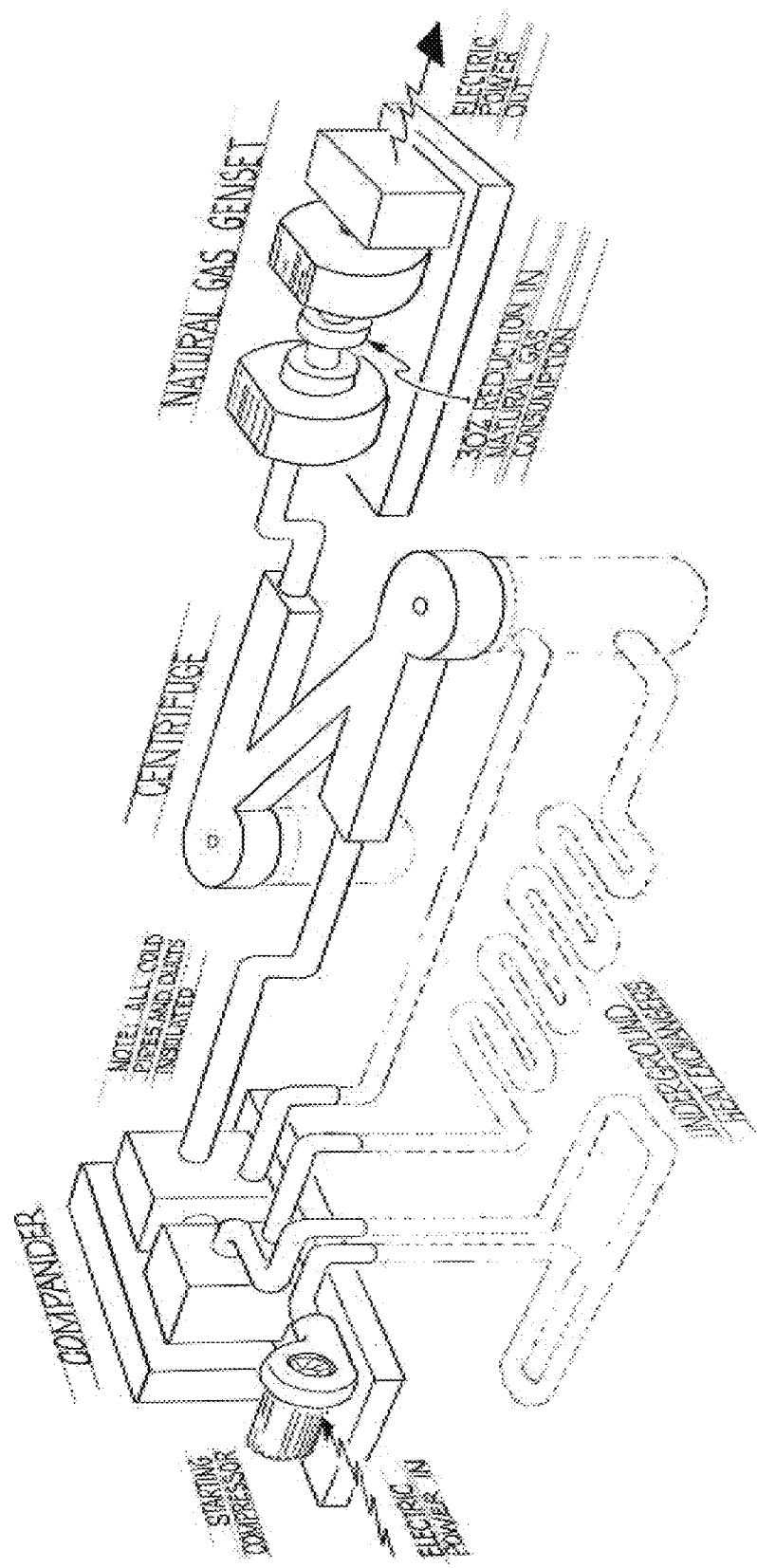
FIG. 10b is a perspective view of the starter-compressor/compander/innovative centrifuge system in line with a natural gas generator set, according to an embodiment of the present invention.
Figure 11A:
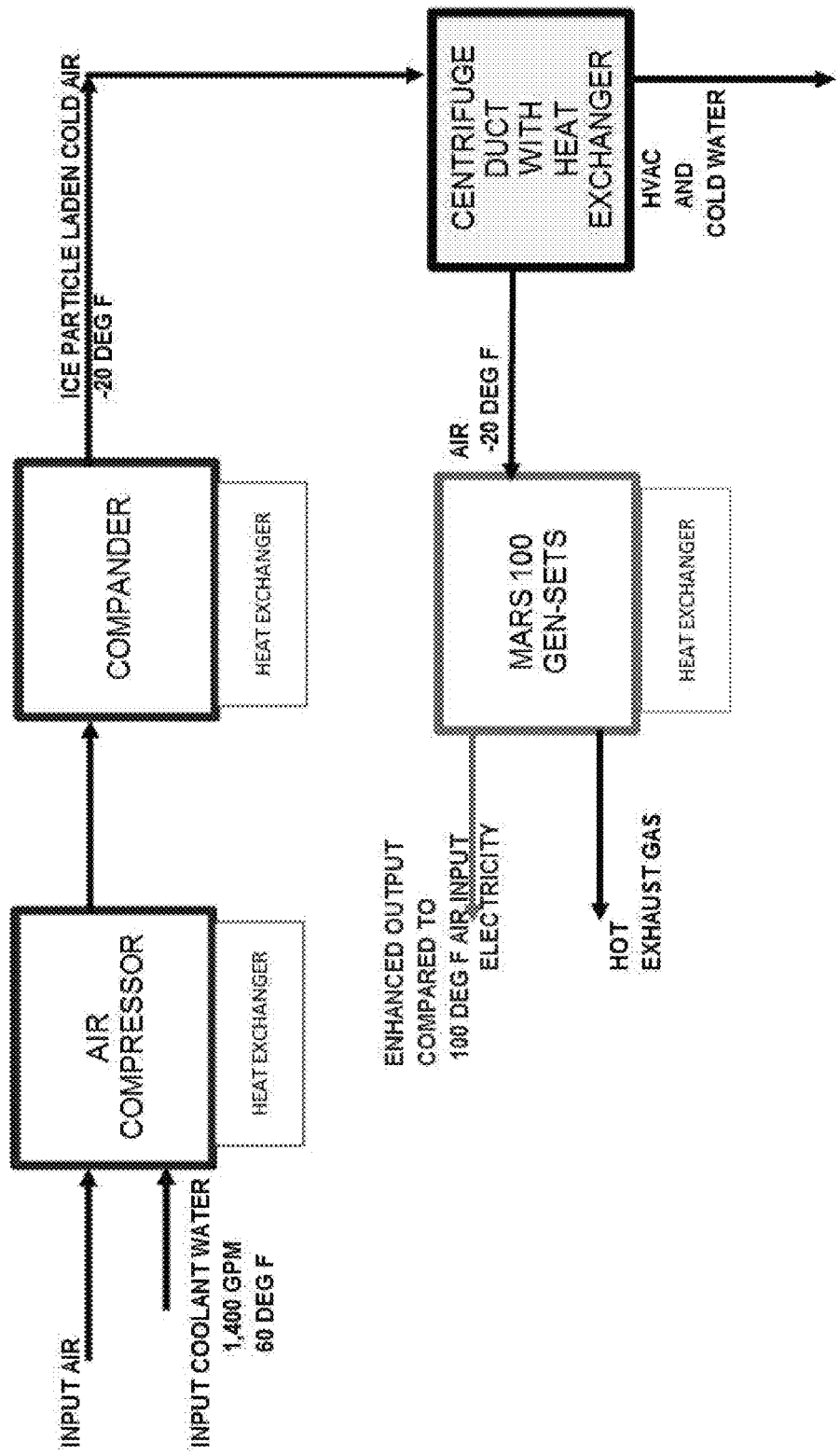
FIG. 11a is a flowchart of the compander/compressor system, according to an embodiment of the present invention.
Figure 11B:
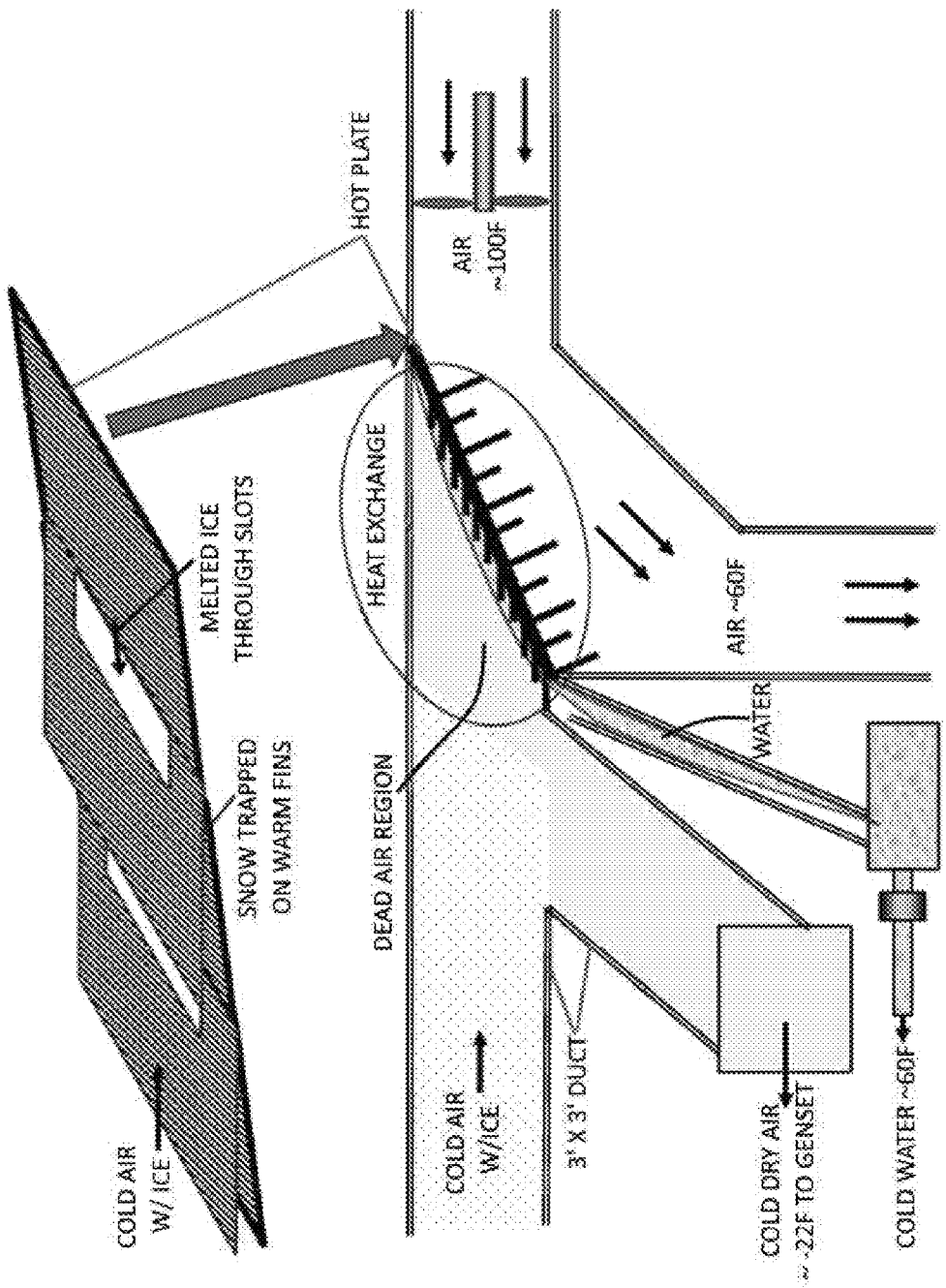
FIG. 11b is a simplified illustration the detail of the centrifuge duct with heat exchanger, according to an embodiment of the present invention.
Figure 12:
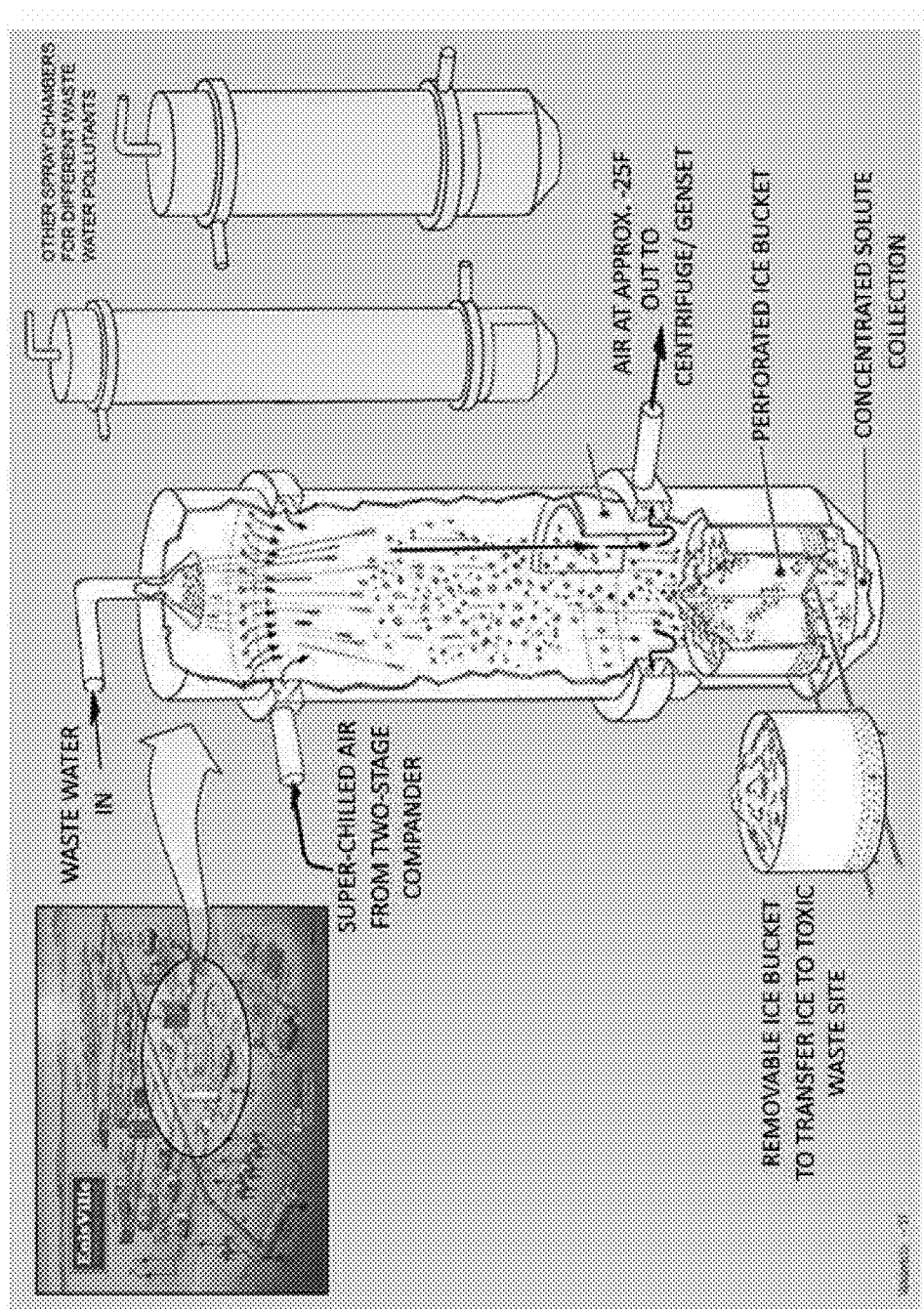
FIG. 12 is a cross-sectional view of the downdraft purification tall tower, according to an embodiment of the present invention.

There is one scenario that can use this system to replace the water-fogger systems used to operate Gen-Sets in hot environments. The water fogger-systems use enormous amounts of water and are not useful in drought stricken area. The Compander and Gen-Set configuration, as shown in FIGS. 10a and 10b, are ideal for this application because there is little water use and small footprint. Use of this setup in Data Centers and in high-rise buildings has widespread application in any modern-day green community.

Many turbo-compressor driven Gen-Sets are designed and tested for arctic operation at minus 22 degrees Fahrenheit. Yet they are operated at much higher temperatures where they are less efficient. For example, conventional inlet turbine air cooling using foggers on a hot afternoon in a desert climate, it is possible to cool by as much as 40 degrees Fahrenheit so that 100 degrees Fahrenheit inlet air will be reduced to 60 degrees Fahrenheit; while in a humid climate hot-afternoon cooling potential can be just 10 degrees Fahrenheit or less so that the result is 90 degrees Fahrenheit inlet air. Many power rooms in a facility are at 100 degrees Fahrenheit inlet air so poor electrical power output is the result. But even if larger temperature drops were possible, the intake of humid air will produce ice particles if colder than 40 degrees Fahrenheit air is sucked into the cowling of the turbocompressor because of the additional expansion of the air by the shape of the cowling. Thus, the limit of conventional cooling systems has been set by ice particle formation and its erosive effect on the high-speed blades of the turbo-compressor.

Herein we remove the threat of ice particle formation by introduction of an innovative centrifuge design . . . and . . . then introduce the one-stage, free-spooling compander to provide minus 20 degrees Fahrenheit inlet air. This will allow the GenSet to provide the same electrical power output with 30% less consumption of natural gas.

GenSets are designed to operate at −22° F. air of the arctic but are typically operated at +40° F. by use of air intake cooling. This inefficiency results in the consumption pf excess natural gas.

In FIG. 10a the starter compressor and one stage, free-spooling compander are available commercially. However, in each case it is necessary to have a nearby heat sink and the means to transfer the heat generated by the compression of the air. Thus, the compressor and the turbocompressor require heat exchangers to cool their output air.

The intake moist air is frozen during the passage through the turboexpander. This freezing process causes the air to be laden with a low concentration of ice crystals. Although there is a low concentration of ice crystals there is a high mass flow of air. It is therefore necessary to remove all ice crystals with diameters larger than 10 diameters because these larger diameters do not track the air stream and will impact and erode the blades of the intake air compressor of the GenSet.

Therefore, an innovative design of Centrifuge is introduced. The duct connecting the output of the compander and the input of the Gen-Set has a Centrifuge comprised of two 135 degree turns in the airflow. To assure the dead zone region at each turn the straight run of upstream duct is extended four equivalent diameters (for ducts with square cross-sections). Thus, at each turn the airflow is forced into a torturous turn that causes the dense and larger particles (ice crystals) to continue on their path and deposit themselves at the dead end of the duct. The smaller crystals will continue with the airstream and successfully turn direction to follow the air flow. Two such turns are shown to assure high collection efficiency. If circumstances require an addition 135-degree turn will be used.

To minimize the loss of the dead air region a slow rotating door is introduced. The rate of rotation is designed to allow filling of the quadrant between the paddles of the revolving doors with minimum air loss to the upstream duct.

The collected ice crystals accumulate in a bucket below the door. The bucket sits in the warm ground so that the ice melts by two mechanisms: (1) Hot air from the turbocompressor that passed through its heat exchanger and then (2) Cooler air that is then further cooled by passing through the ice bucket. When operating in a dry climate the cooler air from the heat exchanger will go through a near empty ice bucket and pass directly to the turboexpander.

The ice bucket walls are grounded into the soil so that it is warmer than 32 degrees Fahrenheit. The heat from the bucket walls transfers to the walls surrounding the rotating door whose blades contain ice. The objective of this heat transfer is to prevent the rotating blades from sticking to the nearby walls thereby preventing rotation of the paddles.

The overall system is designed to permit only small ice particles from the exhausting air stream. It is presumed that the air is fed to a rotating turbo-compressor sucking in this frigid air that is laden with small diameter ice particles and causing no erosive damage to the turbine blades because the ice particles flow harmlessly along the stream lines flow between the turbine blades.

Note that cold water is generated based upon the intake mass airflow, ambient air temperature and ambient relative humidity.

FIG. 10b shows the isometric layout of the innovative Centrifuge that provides safe intake air to the GenSet. If one considers that the intake air is in the power room of a facility that is typically at plus 100 degrees Fahrenheit even though ambient air outside is much lower, the minus 20 degrees Fahrenheit input air will result in the same electrical power output with a 30% reduction in natural gas consumption. Note the small footprint and no use of water.

Conventional inlet turbine air cooling using foggers on a hot afternoon in a desert climate, it is possible to cool by as much as 40 degrees Fahrenheit so that 100 degrees Fahrenheit inlet air will be reduced to 60 degrees Fahrenheit; while in a humid climate hot-afternoon cooling potential can be just 10 degrees Fahrenheit or less so that the result is 90 degrees Fahrenheit inlet air. This compares to our minus 20 degrees Fahrenheit inlet air . . . and no use of water.

Conventional turbine intake air reduction systems either use large quantities of water or large refrigeration systems. They reduce the temperatures from say plus 100 degrees Fahrenheit to plus 45 degrees Fahrenheit for the more expensive cooling systems or down to warmer temperatures depending on the fogger or vaporizer.

Another conventional inlet turbine air cooling system is wet compression. This uses foggers but by spraying more fog than is required to fully saturate the inlet air. The excess fog droplets are carried into the gas turbine compressor where they evaporate and produce an intercooling effect, which results in a further power boost.

Another conventional inlet turbine air cooling system is evaporative cooling. The evaporative cooler is a wetted rigid media where water is distributed throughout the header and where air passes through the wet porous surface. Part of the water is evaporated, absorbing the sensible heat from the air and increasing its relative humidity. The air dry-bulb temperature is decreased but the wet-bulb temperature is not affected. Similar to the fogging system, the theoretical limit is the wet bulb temperature. Water consumption is less than that of fogging cooling.

Another conventional inlet turbine air cooling system is the mechanical vapor compression chiller. The mechanical chiller can increase the turbine output and performance better than wetted technologies due to the fact that inlet air can be chilled below the wet bulb temperature, indifferent to the weather conditions. Mechanical vapor compression chiller equipment has higher electricity consumption than evaporative systems. Initial capital cost is also higher; however, turbine power augmentation and efficiency is maximized, and the extra-cost is amortized due to increased output power. Again, our system takes less space and does not consume water.

Another conventional inlet turbine air cooling system is the vapor-absorption chiller. In vapor-absorption chillers technology, thermal energy is used to produce cooling instead of mechanical energy. The heat source is usually leftover steam coming from combined cycle, and it is bypassed to drive the cooling system. Compared to mechanical chillers, absorption chillers have a low coefficient of performance. However, it should be taken into consideration that this chiller usually uses waste heat, which decreases the operational cost. Again, our system takes less space and does not consume water.

The case where only utility power is available require that high-efficiency companders operating at low input pressure and with low internal peak pressures be used to assure a beneficial energy balance.

However, when there are nearby wind or solar farms that use a TL-CAES system and there is excess flow of cool air available then this compander and Gen-Set combination is useful to offset purchase of additional power that will now be obtained from the higher power output of the existing Gen-Sets and without the need to house the additional Gen-Sets.

The power from intermittent power sources is not always available (no wind or no sun) and the T-CAES or TL-CAES has already emptied its pressure vessels, so that the Gen-Set is still available for operation at its lower power output level for the same natural gas consumption rate, for use in such places as hospital emergency areas of the green community.

FIG. 10c shows the centrifuge efficiency of trapping aerosols fine particles in a duct with a 90-degree bend. Note that below 10 microns aerosol particles were by-passing the bend with a less than 10% efficiency. The duct configuration we introduce has a more torturous bend because of three design differences: (1) Extension of the straight portion of the duct by at least four diameters to create a dead zone thereby introducing a more curve streamline so that some streamlines actually enter and leave the mouth of the dead zone causing an abrupt 180 degree turn to cause even smaller particles to leave the air stream. (2) 135 degree bend in duct compared to 90 degree bend in the duct shown in this figure and (3) Two 135 degree turns are used to enhance capture efficiency . . . and even more bends can be added at little expense to achieve higher deposition rates for the smaller particles.

FIG. 11*a* shows an example system of compander/centrifuge/Gen-Set.

FIG. 11*b* shows an idealized Centrifuge without the use of a large dead air zone at the end of a straight run of ducting and a means of collecting the ice particles. This passive system is simpler than the larger dead zone and use of a revolving door.

The compander and GenSet system has been captured in U.S. Pat. No. 8,833,083, "method and apparatus for using compressed air to increase the efficiency of a fuel driven turbine generator.

FIG. 1 inset in FIG. 12 shows a solution to the need for a supply of fresh water to a community. Fresh water is paramount above all other needs to the green community. The green community can suffer through the typical disadvantages of an electrical power outage but cannot long survive without water.

In cases where water is available from nearby seawater or from nearby wells of brackish water or from nearby ponds of commercial, agricultural or mining waste water the TL-CAES system has the power level and the generation of these power levels over day(s) long during absence of wind or sun.

FIG. 12 shows the intake of a warm waste water stream that is converted to a spray of specified diameter waste water droplets. The nozzle diameter and the pressure difference across the nozzle assure a mean diameter that is specified. This specification is based upon the need for a high surface to volume ratio droplet to assure rapid chilling into the interior of the droplet during the vertical trajectory of the droplet. This specification is also based upon the opposite need for a low surface to volume ratio droplet to assure maximum drainage of the brine film from the surface of each ice crystal once it has fallen to the bottom of the chamber. The mass accumulated at the bottom of the chamber will permit rapid drainage between the voids and from the surface of the ice crystal when the droplet size is sufficiently large (small surface to volume ratio).

There is an optimum droplet diameter based upon the surrounding air temperature and the residence time of the droplet in the air stream. The initial temperature of the waste water droplet may be 60 degrees Fahrenheit and the adjacent air at minus 175 degrees Fahrenheit when at the top of the chamber. Several seconds later the droplet may be at minus 6 degrees Fahrenheit and the adjacent air at minus 25 degrees Fahrenheit. The minus 6 degrees Fahrenheit conforms to the eutectic temperature of sodium chloride solutions. And the minus 25 degrees Fahrenheit conforms to the air temperature needed downstream to drive the Gen-Set at its best performance.

The dead zone at the bottom of the chamber is comprised of the accumulated ice particles at minus 6 degrees Fahrenheit.

There is an energy balance such that there is sufficient mass of cold air supplied to freeze the waste water droplets and meet the heat losses through the facility walls.

Each different solute will require different eutectic temperature requirements and residence time in the chamber. Therefore, other chambers are shown in the background.

Since the air and waste water both co-flow in the downward direction we call this facility the downdraft facility. The facility is designed for outdoor use where high is not strictly limited. However, the system components are simple, lightweight, easy to assemble/disassemble and portable.

In its simplest application, the waste water will be salt water. But with additional tests in a more instrumented version, more complex waste waters will be treated. The removal of arsenic and heavy metals associated with mining operations are relevant here.

In this figure, a batch operation is shown. However, this system can be modified to operate continuously.

There are scenarios wherein the high concentrated residue solution loaded with solutes must be collected and reused.

This will be accomplished by dealing with smaller facilities that will further process individual solutes.

Figure 13A:
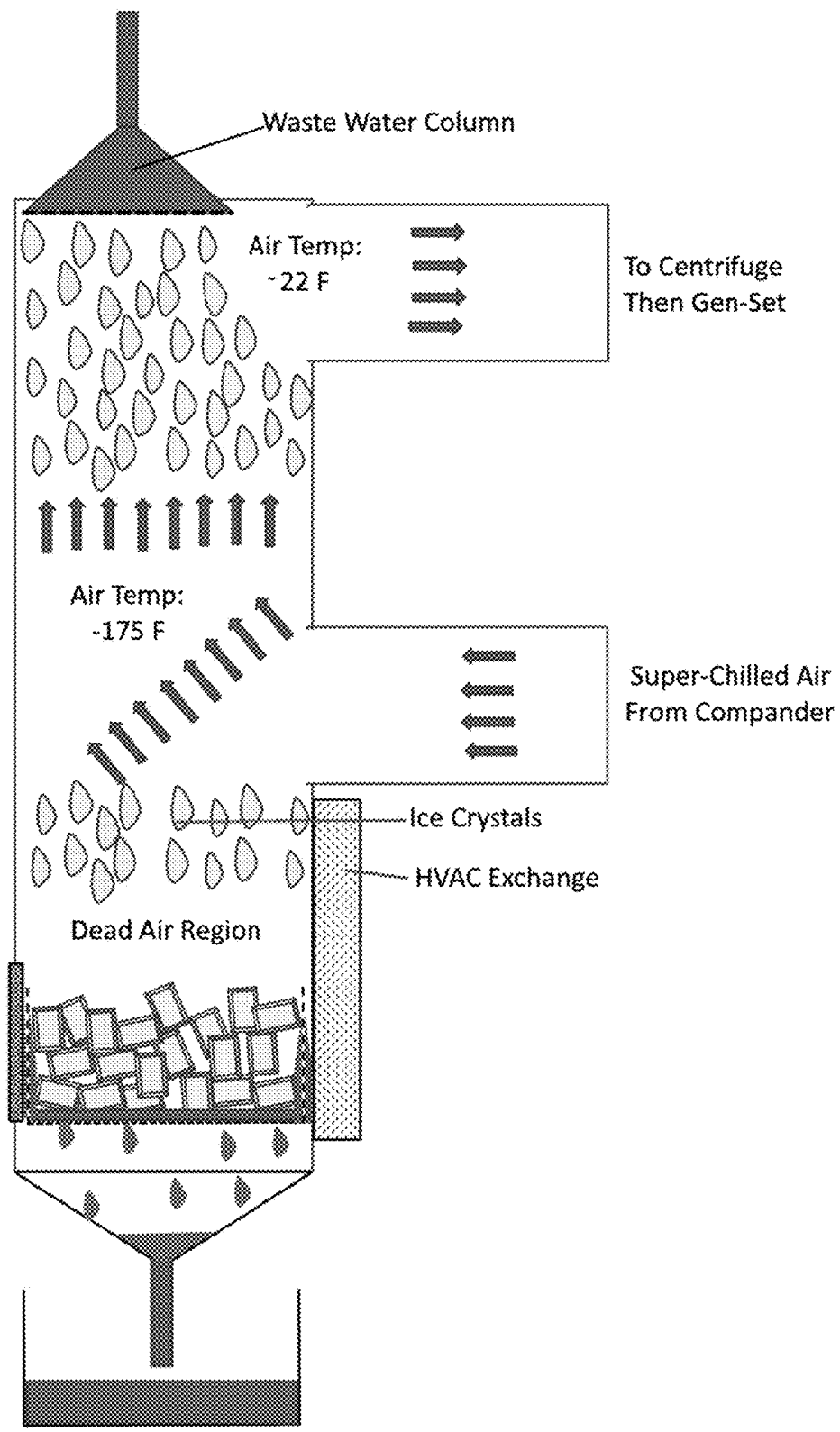
FIG. 13a is a cross-sectional view of the updraft purification short tower, according to an embodiment of the present invention.

In FIG. 13a the updraft chamber is shown. The warm waste water droplets attempt to fall down but the updraft of super chilled air slows the droplet downward displacement.

The operation of the updraft versus downdraft FCSC is the same except that the residence time of the droplet can be increased in a much shorter chamber.

Figure 13B:
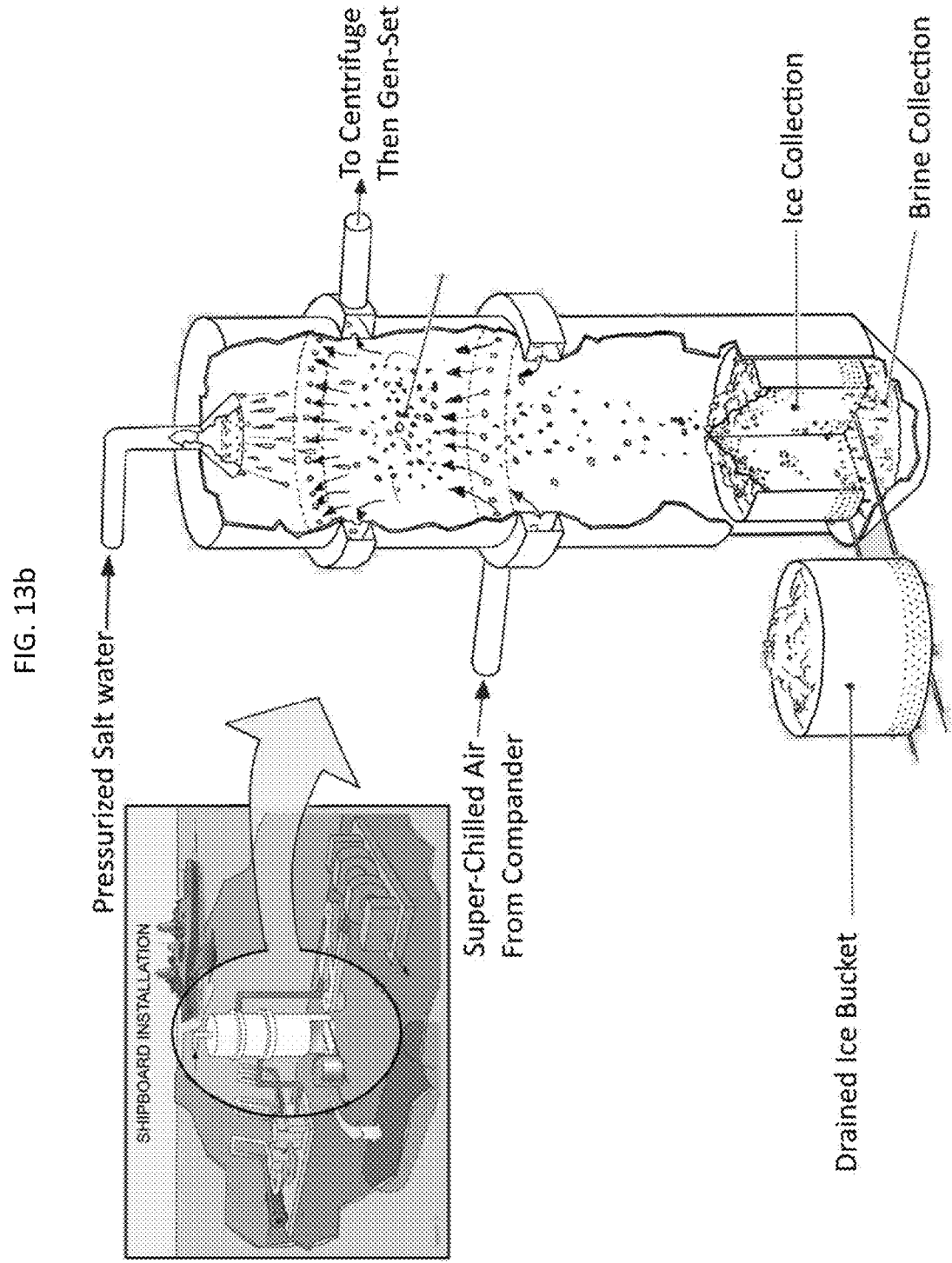
FIG. 13b is a cross-sectional view of the updraft salt water purification short tower aboard a ship, according to an embodiment of the present invention.

In FIG. 13b a more detailed version of the shipboard downdraft chamber is shown. In particular, the heat exchangers are shown attached to the cold walls of the ship so that the ocean is the infinitely available heat sink. The objective here is to: (1) Supply fresh water from seawater and (2) Generate electricity using only the small available space aboard ship and reduce the need for large fuel storage for the Gen-Set.

Figure 14:
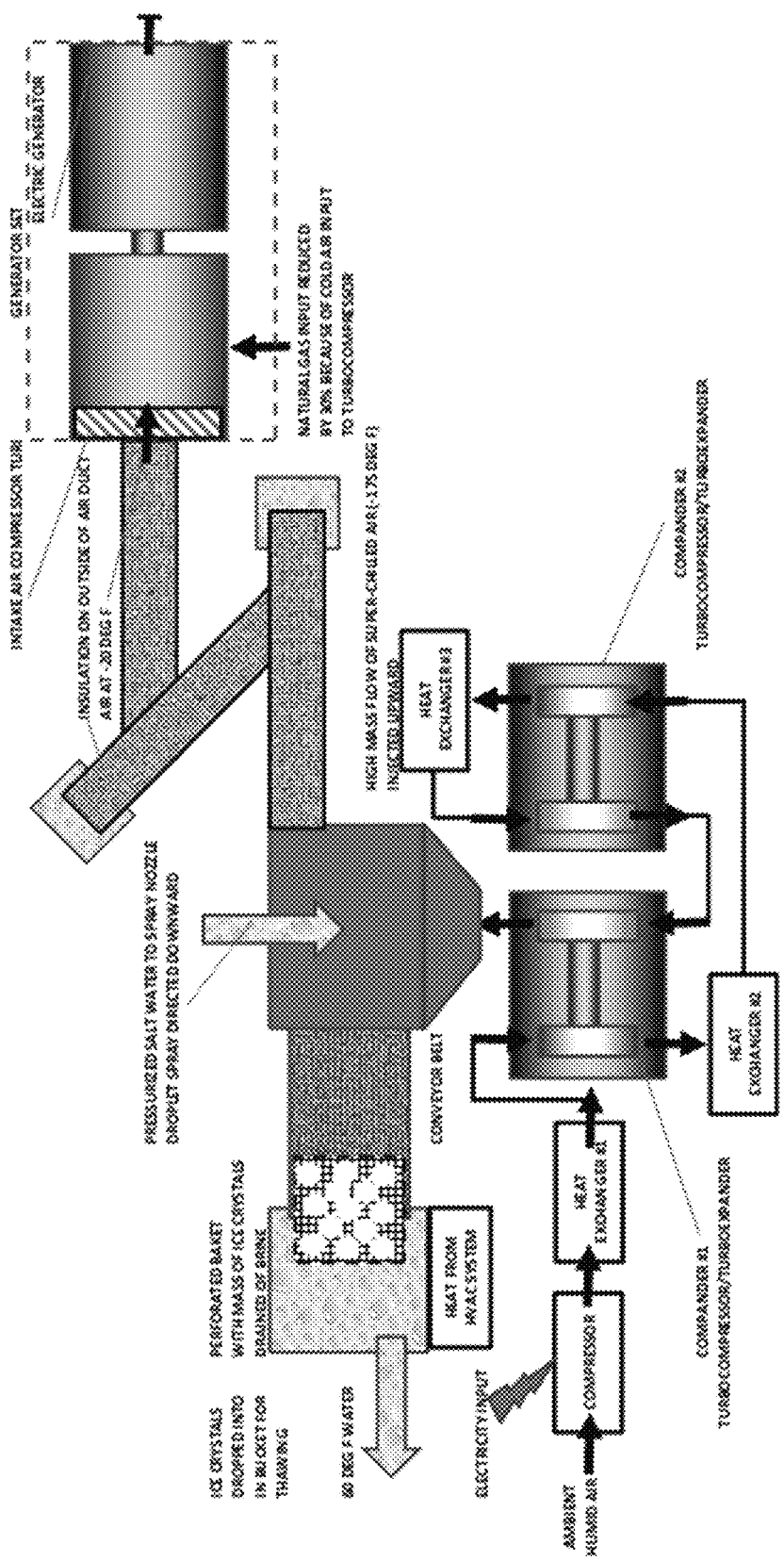
FIG. 14 is a diagram of the downdraft purification system including a starter compressor, two-stage, free-spooling Compander, Centrifuge and a Gen-Set, according to an embodiment of the present invention.

In FIG. 14 there is a schematic drawing of the system shown in FIG. 13b top left corner. The schematic details the system comprising a compander, purification tower, centrifuge, and turbine GenSet which works to supply fresh water and generate electricity for the ship.

Figure 15:
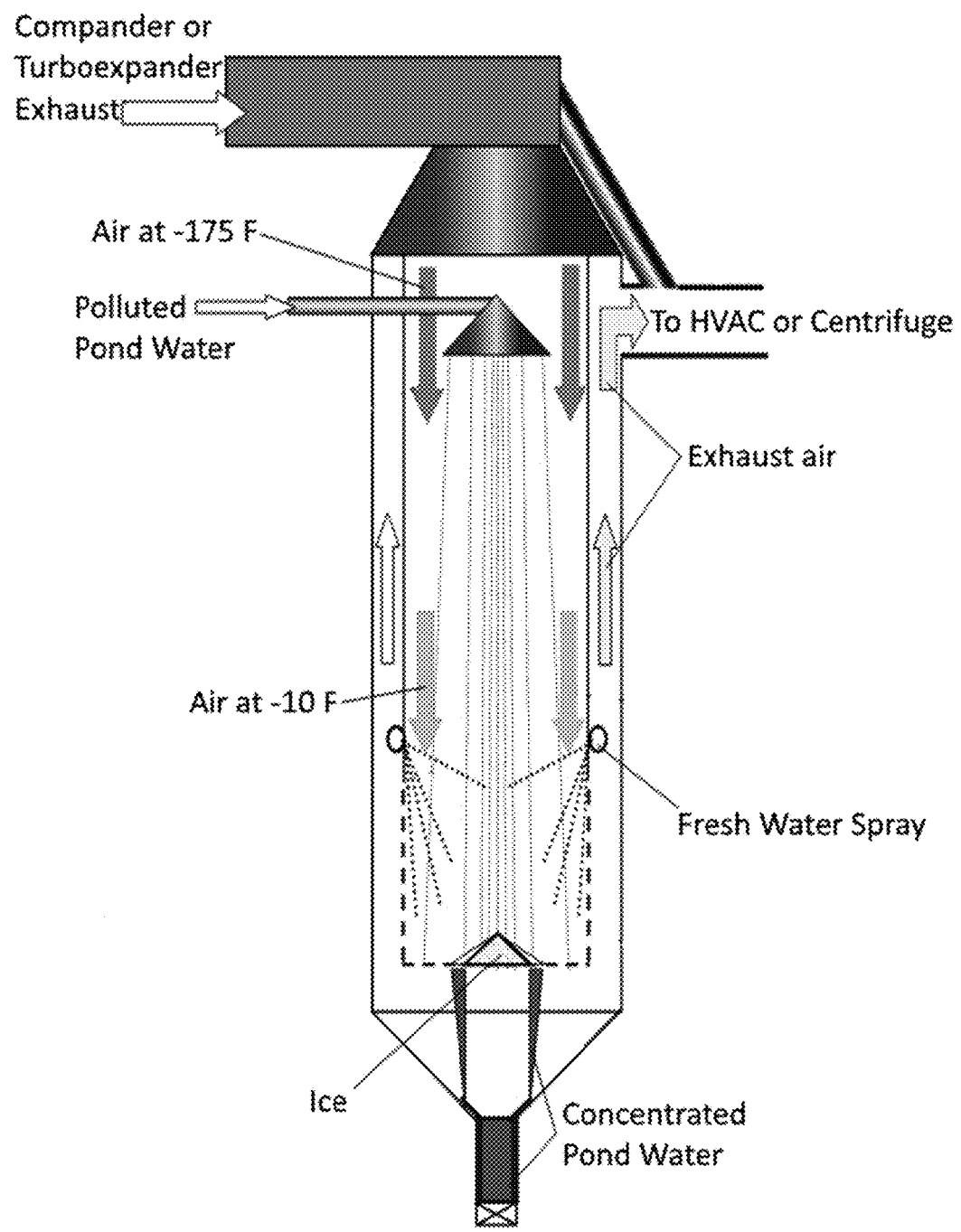
FIG. 15 is a diagram of the downdraft Freeze Crystallization Spray Chamber (FCSC) system, according to an embodiment of the present invention.

Furthermore, the construction of the downdraft spray chambers, as shown in FIG. 15, is simple because the basic parts are inexpensive and widely available. The system is so lightweight that it is portable for use at different sites as needed. The initial capital investment is small. Thus, several of these facilities can operate at different locations throughout the green community.

There is also a permanent laboratory support facility for the downdraft and the updraft spray chambers that needs to be used on a continuous basis in the green village. In fact, this laboratory facility can serve other green communities who will also share in the cost of its operation. Thus, laboratory support facility is small in floor space and height but contains sophisticated instrumentation. Each new pollutant will require examination in this facility so that the chilled air flow rates and waste water droplet sizes are adjusted to achieve high separation factors between water and solute.

The freeze crystallization spray chamber has been captured in U.S. Pat. No. 7,856,843 "thermal energy storage system using compressed air energy and/or chilled water form desalination processes", U.S. Pat. Nos. 8,863,547 and 8,653,60 "desalination method and system using compressed air energy systems", U.S. Patent Publication 2010/0018247 "desalination method and system using a continuous helical slush removal system", and U.S. patent application Ser. No. 15/209,666 "eutectic freeze crystallization spray chamber".

Figure 16:
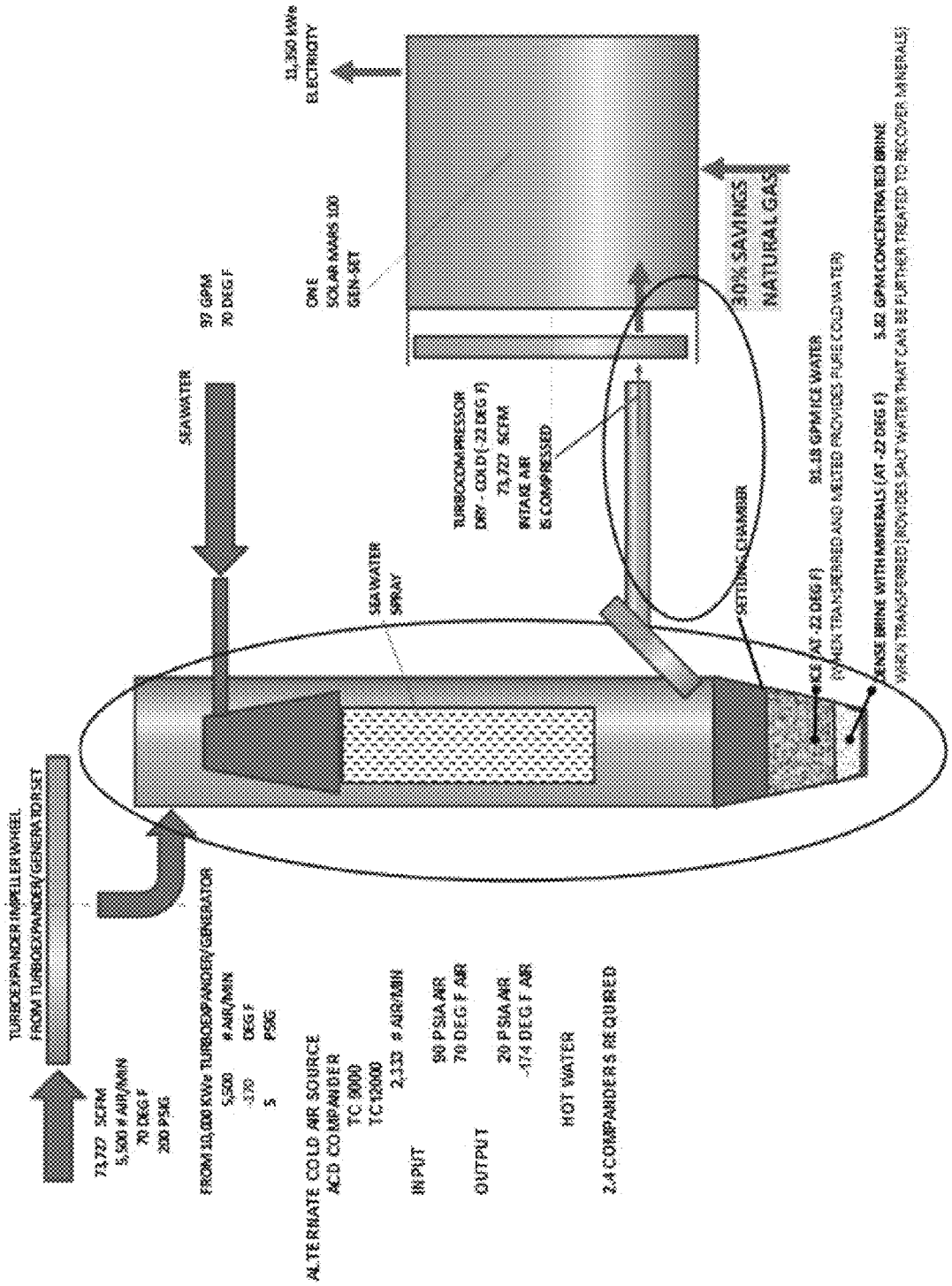
FIG. 16 is a flowchart depicting the downstream interaction of the FCSC system with a (1) Centrifuge for ice removal and (2) Gen-Set, according to an embodiment of the present invention.

FIG. 16 shows chilled Air from T-CAES/TL-CAES system feeding Water Purification, Centrifuge, Gen-Set and Thermal Energy Storage (TES) tank.

There are facilities wherein tall and large diameter water tanks used to store water. The tanks are tall enough so that water stratification develops in the tank so that cold water accumulates at the bottom and warm rises to the top. The tank diameter is sufficiently large so that the rise of the warm water does not create a stirring action that destroys the stratification. Cold water is fed to the bottom of the tank from this process or cold water that is available at night time. When cold water is fed into the bottom of the tank the dense cold water forces the less-dense warm water to rise and be used elsewhere. It is the cold water that has many uses for HVAC and even for cooling inlet air to turbo-compressors driving Gen-Sets.

Figure 17:
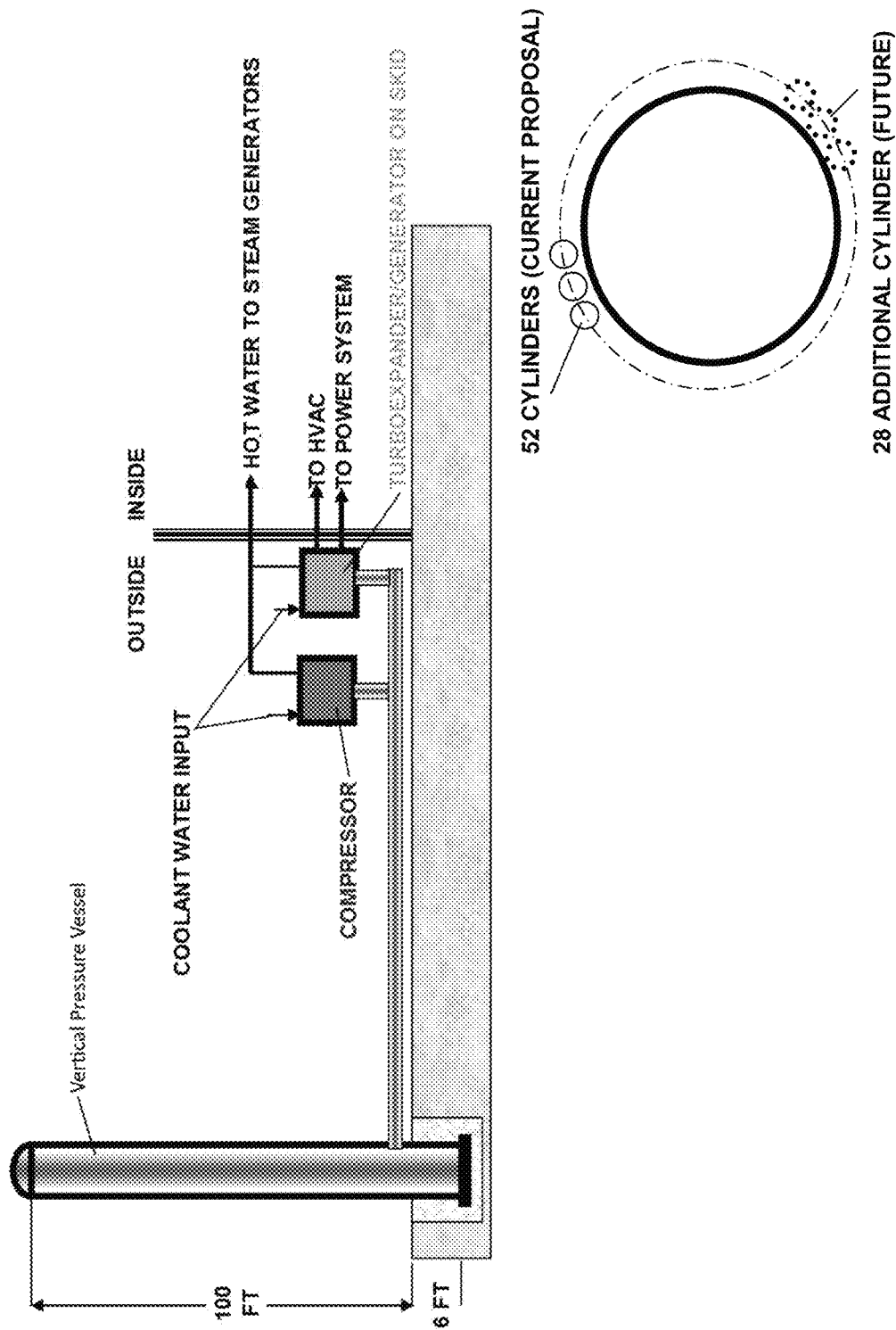
FIG. 17 is the description of a T-CAES system with 3 feet diameter, vertical pressure vessels surrounding a Thermal Energy Storage (T.E.S.) tank wherein two compatible green energy systems are combined.

A T-CAES system, as shown in FIG. 17, is ideal for this configuration. A series of vertical high pressure storage vessels, say 3 to 4 feet in diameter and 100 to 120 feet tall can be installed in a circle around the outside of the water storage tank. The available water storage tank is usually part of a Thermal Energy Storage (T.E.S.) system wherein the hot water floats above the dense cold water at the bottom of the density stratified water tank.

The high mass flow of super-cold air from the T-CAES system has the usual many applications. But one additional application becomes available because there is now going to be more cold water inflow into the storage tank that results in immediate use as well as later use. This additional application became possible because of the presence of both systems in a nearby configuration that is made possible by a technology driven green community.

In reference to FIG. 17, there are existing freeze crystallization facilities built by NIRO in the Netherlands. That technology is based on freezing of large volumes of bulk liquid wastewater, using conventional refrigeration technology, hours-long chilling time per vat, and mechanical removal of ice from heat exchanger surfaces.

The facilities use freeze crystallization and do not attempt eutectic freeze crystallization in these huge facilities.

The use of liquid refrigerants housed in metallic heat exchanger for freezing another liquid is the approach pioneered by NIRO. This procedure has been perfected by earlier studies at Delft University.

The approach described, and shown in FIG. 18a-18e, herein uses the high mass flow of super-chilled air at −175° F. to chill a large volume of water. The approach described herein permits extremely strong temperature difference between the cold air and warm waste water. Furthermore, the approach described herein uses direct contact between the wastewater and chilled air with no metallic heat exchangers. However, the density difference between air and wastewater forces a configuration wherein a droplet spray of water in a larger volume containment facility is required to permit rapid heat transfer. In addition to rapid heat transfer, it is necessary to assure sufficient residence time for the pollutants to be strongly expelled during the developing ice crystal structure so that there is an ice crystal coated with dense liquid brine film.

The droplet spray offers special advantages during chilling. The small droplets have a large surface to volume ratio so that heat transfer is fast. Also since the cross-sectional area of the spray chamber is large compared to volumetric flow rate, such that the air speed in the chamber is slow enough to permit chamber heights (droplet fall distances) that are practical. For downward air flow and downward water droplet flow the residence time may be of the order of 2 to 4 seconds for practical spray chamber heights.

Although small droplet diameters permit rapid heat exchange, it is necessary to consider that very small diameter crystals deposit in a tight mass at the bottom of the spray chamber so that efficient drainage is not permitted. Large droplet diameters deposited as large crystals at the bottom of the spray chamber do permit rapid and efficient drainage of the brine. Thus, there is an optimum droplet diameter that must be selected for the spray nozzle at the top of the spray chamber. This optimum droplet diameter will be created by selecting the design pressure difference and spray nozzle diameter to create this optimum droplet diameter.

Thus, if upward flow of air is considered and the water droplets fall vertically downward, the water droplets will be virtually stationary. When the high mass of super-chilled air is introduced upward as the droplets of waste water are introduced downward, the droplets fall at a slower speed. More residence time is achieved in a shorter chamber. This approach is useful when there is limited height available for the chamber. A shipboard scenario is an example. For large water droplets, this permits reasonable residence times in the spray chamber of more than 10 seconds.

On the other hand, if downward flow of air is considered, smaller water droplets will permit 2 to 4 seconds of residence time in the spray chamber to affect completion of the heat exchange.

The above two paragraphs treat the process wherein heat exchange takes place so that the droplet at warm temperature at injection will attain the eutectic temperature when it impacts at the bottom of the chamber and accumulates as a porous ice mass. This ice mass when thawed is almost pure water.

There is a very thin film of liquid brine that does not drain from the surface around each ice crystal. For higher purity, it is necessary to perform several wash procedures to remove this thin film of brine that still contain solutes.

It is proposed to use the Freeze Crystallization Spray Chamber #1 to treat a large volumetric input of waste water and to remove the large mass of porous ice mass in a steady system. In this case, where so much mass is involved it will only be practical to remove some, if any of the crystal solutes.

However, we are also interested in processing the high concentration residue of Chamber #1 that is now very reduced in size. At this point we consider using the tight controls demanded of holding the eutectic temperature so that one type of salt or mineral can be removed. Now, with a smaller volume to treat we can work more complex tasks.

Each time that some of the crystals deposited at the bottom of the miniature Chamber #2, the remaining residue becomes less concentrated. Since we are still at the same eutectic freeze temperature but with less concentration than the eutectic concentration, we again generate more ice that can be removed and more solute that can be removed. The succession of this process will produce additional recovered ice and recovered solute . . . but less and less at each successive step.

This integrated process for Chambers #1 and #2 is repeated to extract each of the constituents in the wastewater, similar to any other temperature distillation process.

Government regulations will not permit dumping any of the residues into the environment so that there needs to be a commercial application for each recovered pollutant and concentrated brine of that pollutant.

The green community can be created by retrofitting an existing community containing a carbon-based fueled power plant or by installing a carbon-based fueled power plant using carbon capture technology.

There are a number of carbon dioxide ($CO_2$) removal techniques involving chemicals that absorb and desorb the $CO_2$. However, in the green community we can avoid these chemical-based processes.

The system for chilling air from the T-CAES or TL-CAES system is captured in U.S. Pat. No. 7,856,843 "thermal energy storage system using compressed air energy and/or chilled water from desalination processes".

Figure 18A:
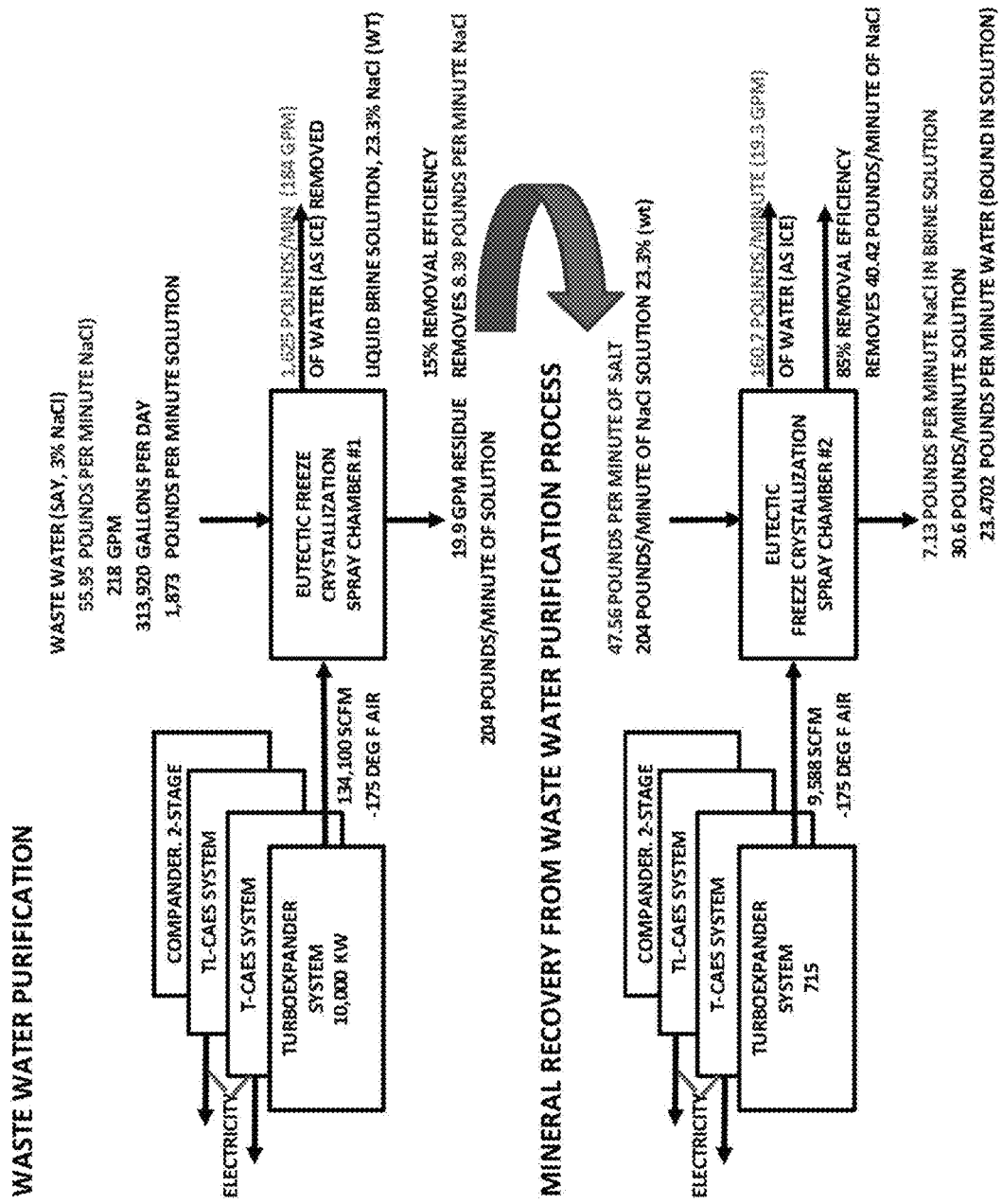
FIG. 18a is a diagram showing the benefits of the Freeze Crystallization Spray Chamber (FCSC) facility, according to an embodiment of the present invention.

In reference to FIG. 18a, in an optimum configuration for treating large mass inflows of waste water there is a hybrid approach wherein the Reverse Osmosis Plant (with all its upstream filtration steps) treats the large mass flow. The remaining residue comprises a smaller mass flow of more concentrated waste material.

It is this smaller waste water mass flow that is then processed by the Freeze Crystallization Spray Chamber (FCSC). It is this flow that is processed in the upper portion of FIG. 18a.

The residue of the FCSC is then sent to a smaller FCSC with tighter controls to treat the highly-concentrated waste water. Note the smaller mass flow treated by the lower portion of FIG. 18a than the upper portion of FIG. 18a. The smaller flow permits the tighter control.

Ultimately, it is the residue of the FCSC system in lower portion of FIG. 18a that comprises the mineral recovery for reuse locally or for use elsewhere in another application.

Figure 18B:
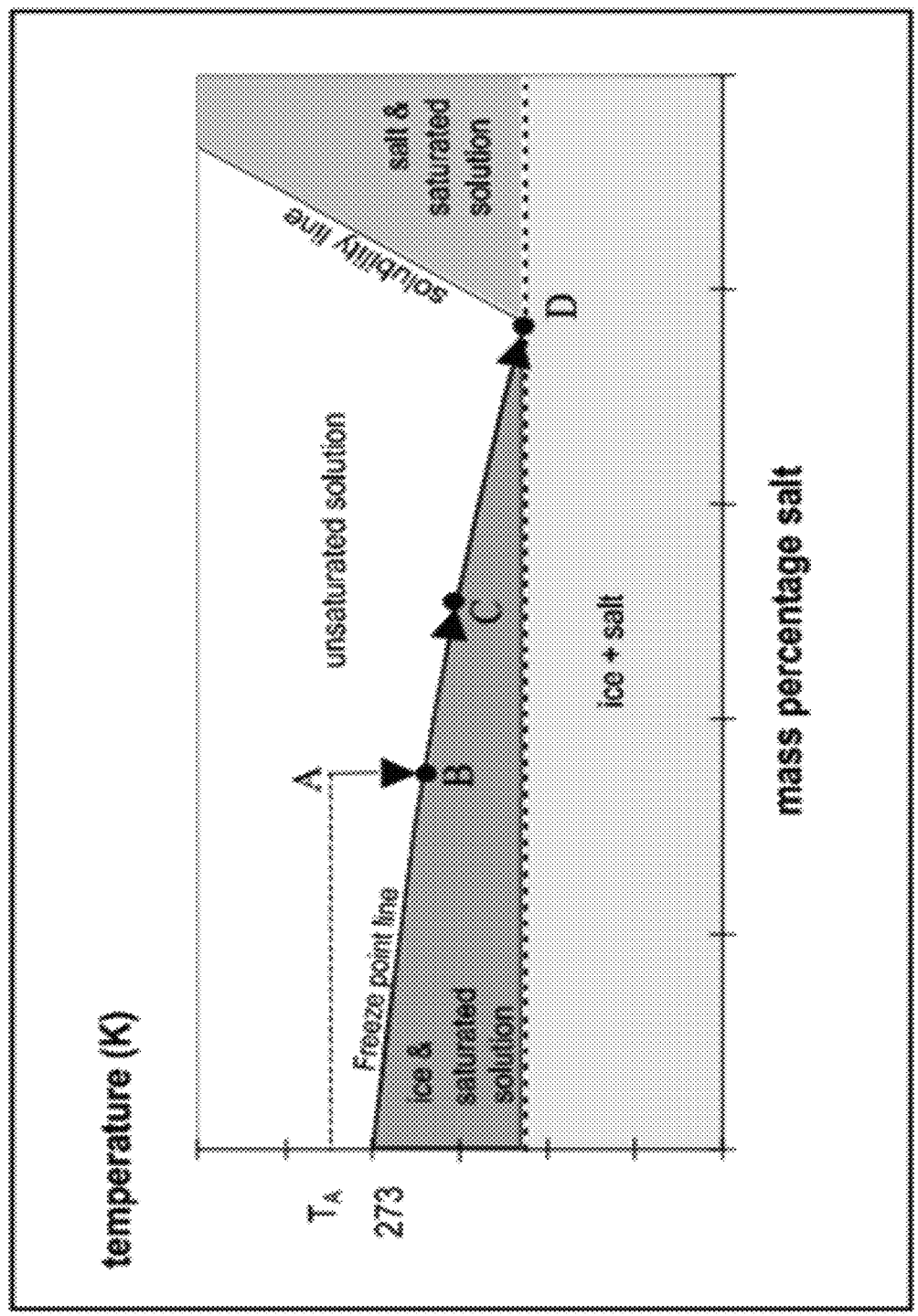
FIG. 18b is a graph of eutectic freeze crystallization, according to an embodiment of the present invention.

In reference to FIG. 18b, the main difference between the operations of the FCSC in the upper portion of the diagram versus the lower portion of the diagram is shown. In the upper portion of FIG. 18a, we work with solutions to the left of point D whereas in the lower portion of FIG. 18a we work with solutions to the right of point D. But in both cases, we are dealing with approaching Point D.

Figure 18C:
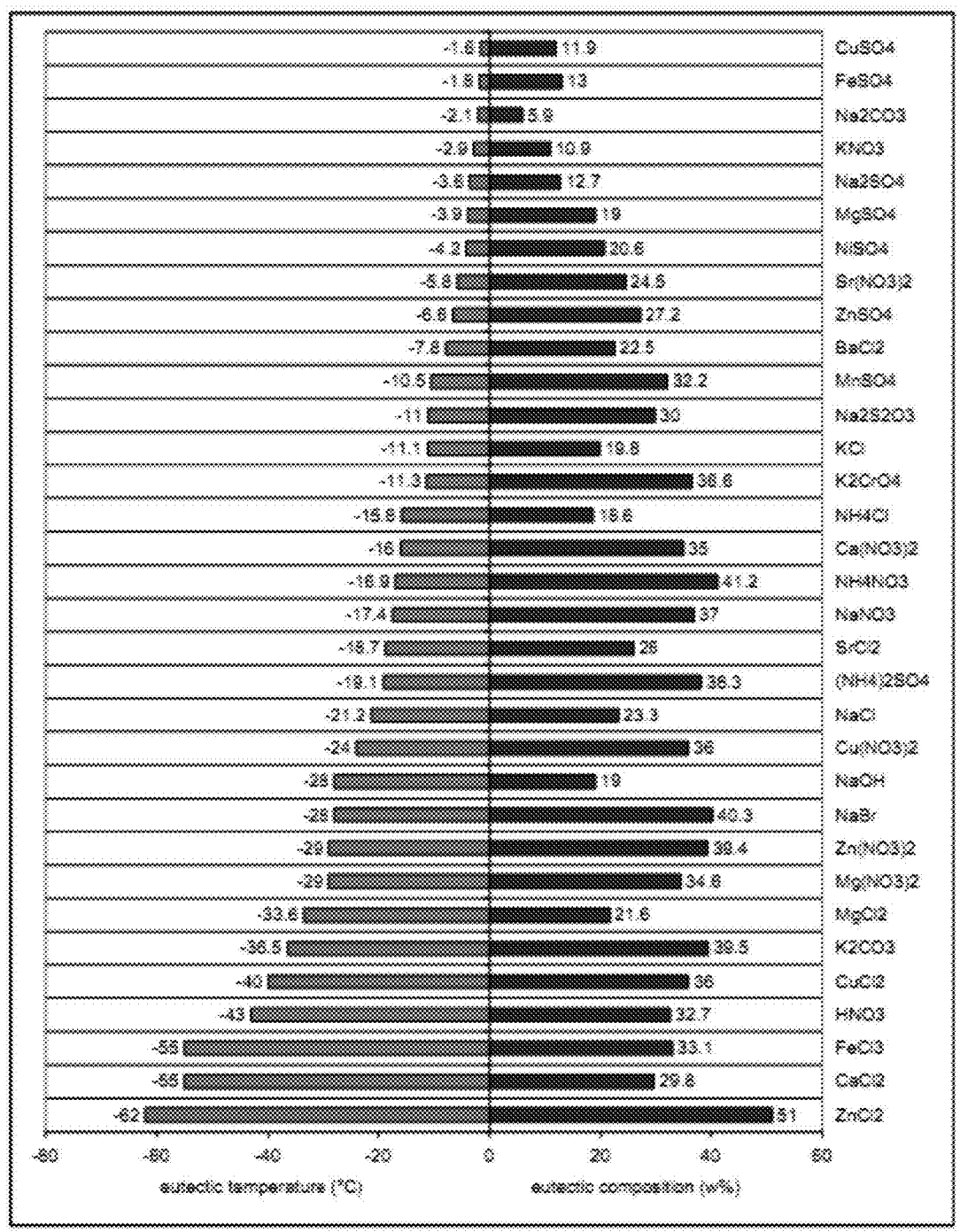
FIG. 18c graph depicting eutectic characteristics for different minerals, according to an embodiment of the present invention.

In reference to FIG. 18c, waste water typically contains a mixture of solutes. Each solute has its own Point D (FIG. 18b). Thus, there is a distillation process that will be used to progressively remove each solute by working at different eutectic temperatures.

In reference to FIG. 18d, the desalinization chamber #1 processes more than a 10-fold amount of waste water compared to the mineral recovery chamber #2 so that there is a corresponding reduction in required power input. This calculation shows NaCl salt. Other solutes will have their specific eutectic temperatures and heats of fusion.

In reference to FIG. 18e, the energy balance is carried further, wherein the dimensions of the chamber are shown as an example of a practical system.

The mineral recovery system has been captured by U.S. Pat. No. 8,677,769 "mineral recovery system for desalination".

Figure 19A:
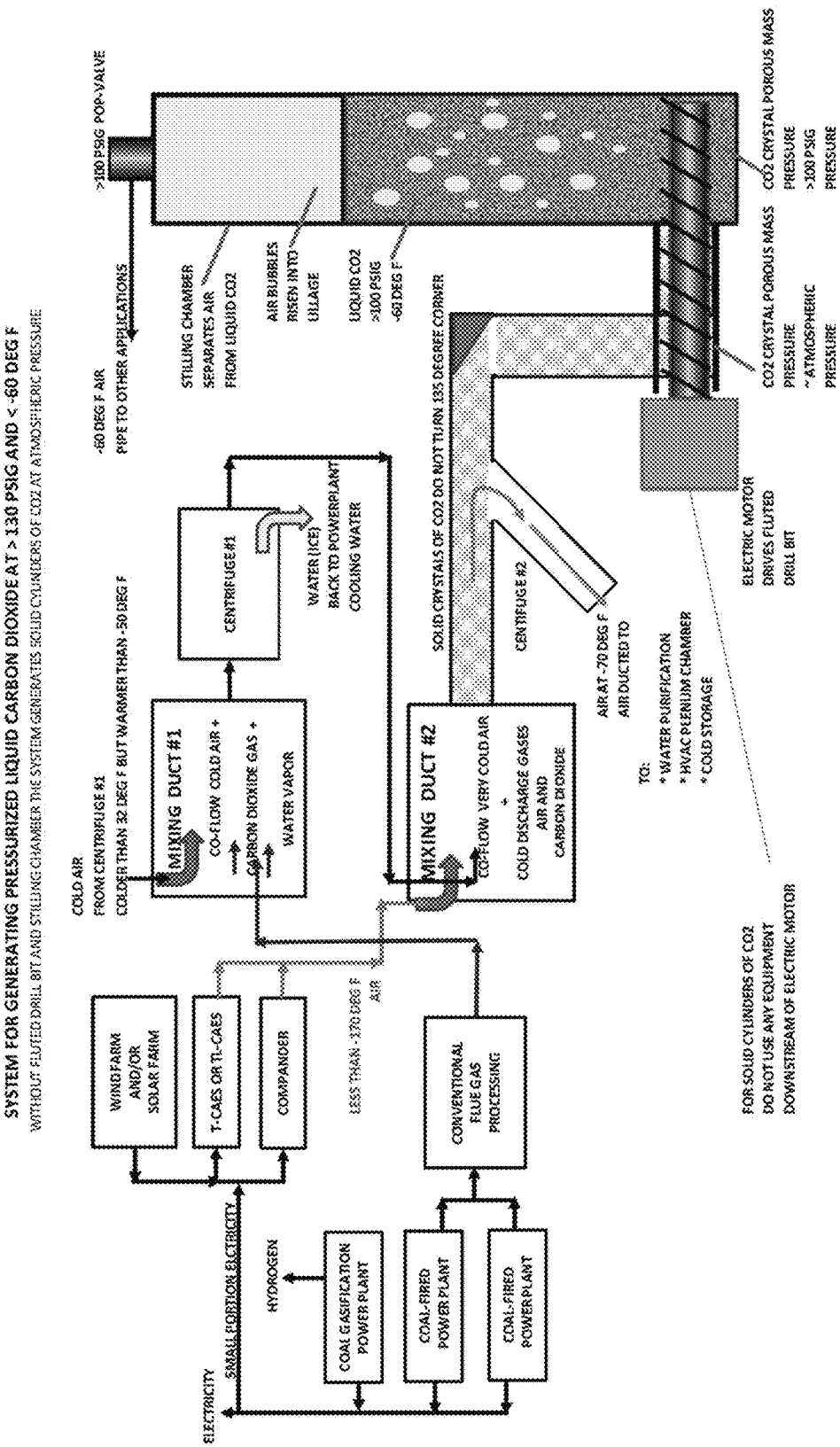
FIG. 19a is a flowchart of the system for generating pressurized liquid carbon dioxide, according to an embodiment of the present invention.
Figure 19B:
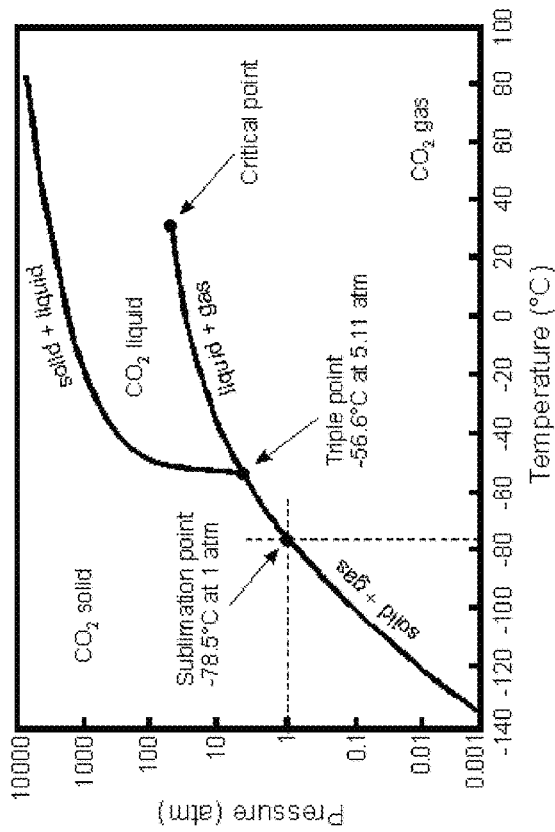
FIG. 19b is a graph depicting pressure and temperature regions where CO2 is a liquid and where it is a solid, according to an embodiment of the present invention.

We use the TL-CAES system with its available high mass flow of super-chilled air to capture the water vapor as well as the carbon dioxide, as shown in FIG. 19a-19b. Both have valuable uses in the green energy community as they exist in their raw state. But they each have other applications as well.

For example, the frozen $CO_2$ blocks can be used in recovering oil from abandoned oil wells and pressurized liquid $CO_2$ can be used to recover gas and oil from the right type of shale.

It is important to note here that the green community will take advantage of natural gas and oil. But this advantage will include their use in conjunction with carbon capture equipment in green systems so that clean air and clean water is sustained.

There are a large number of abandoned oil well sites that have so marred the associated the real estate and developers moved on. And they repeat this fouling of the land elsewhere.

In reference to FIG. 19a, the process for removing water vapor ($H_2O$) and carbon dioxide gas ($CO_2$) from a power plant plume is depicted.

In reference to FIG. 19b, when the $CO_2$ is at atmospheric pressure it is a gas over a wide range of temperatures. It takes an extremely cold temperature to form solid $CO_2$ When $CO_2$ is at higher pressures it is possible to solidify the gas at warmer temperatures.

When $CO_2$ is raised to even higher pressures it is possible to liquefy the gas at still warmer temperatures. Thus, when the $CO_2$ is transported by trailer it is pressurized to permit transfer in its dense form and with little loss to vaporization in a trailer with a vacuum jacketed wall.

The gases in the plume of a power plant fortunately permit the removal of H2O and CO2 by the use of reducing the plume gas temperatures so that the H2O is removed as a liquid and CO2 is removed as CO2 crystals as CO2 snow. This is shown at the bottom of FIG. 19b (left).

The typical flue gases contain inert nitrogen gas that passes on through the system. The other two largest percentages of gas in the flue are H2O and CO2. Thus, the plume supplies meaning quantities of H2O and CO2 that can be recovered and used rather than wasted.

The method of oil CO2 separation has been captured in U.S. Patent Publication 2009/0205364 "method and apparatus for removing carbon dioxide from coal combustion power plants".

Figure 20A:
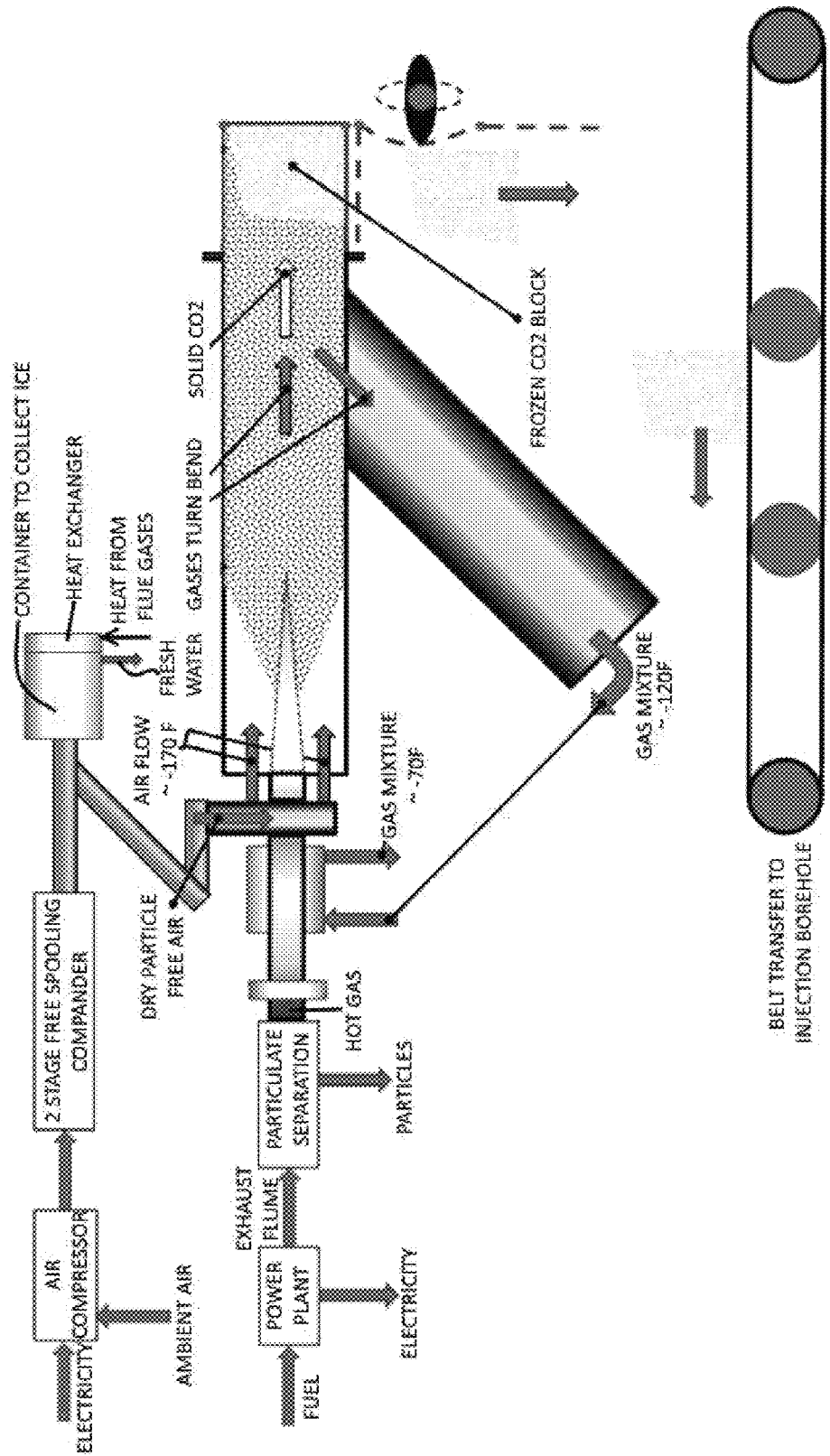
FIG. 20a is a flowchart of the compander, heat exchangers and centrifuge system to remove CO2 as solid blocks and remove H2O as solid blocks from a power plant hot gaseous plume, according to an embodiment of the present invention.
Figure 20B:
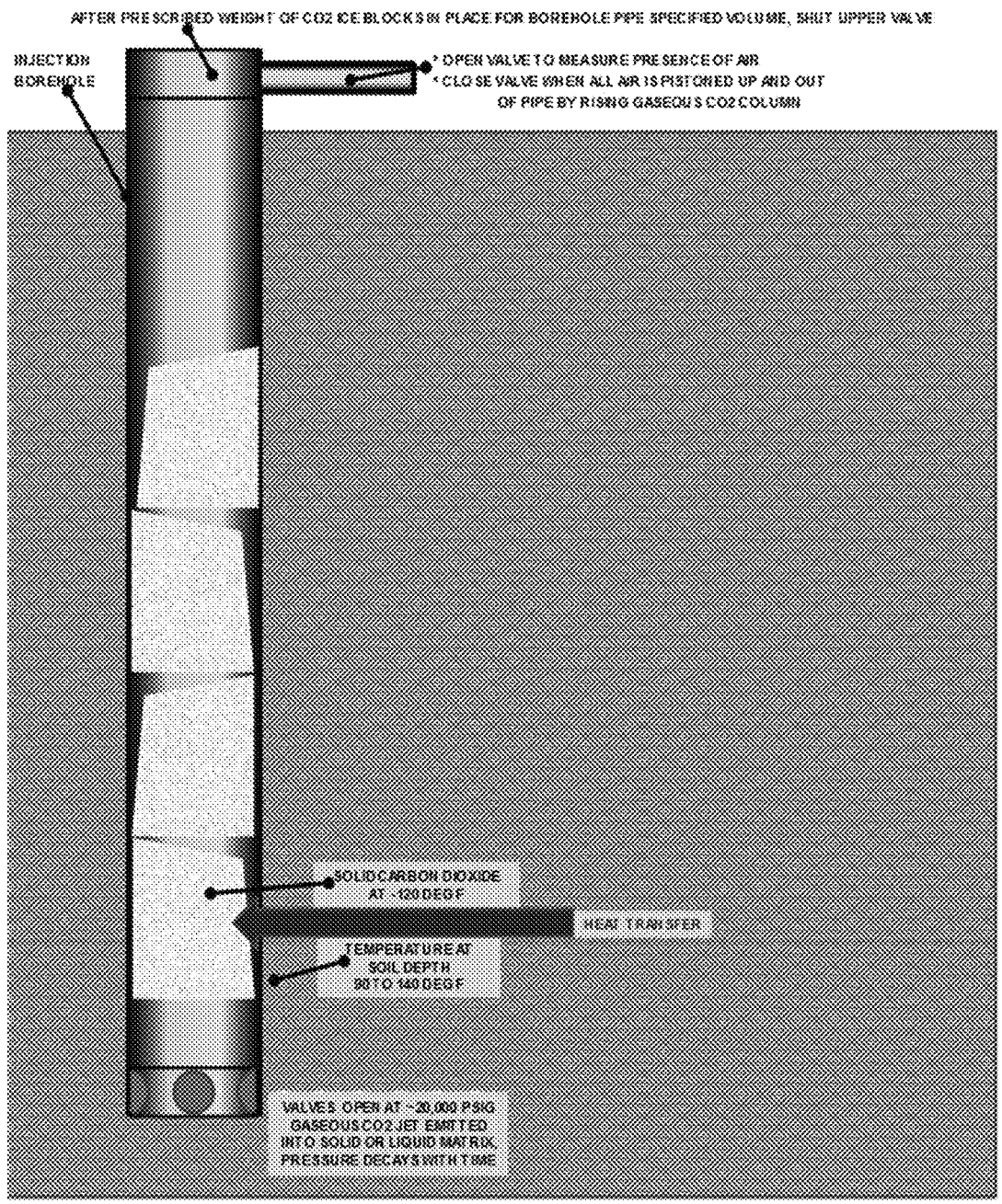
FIG. 20b is a sectional view of the injection of solid CO2 blocks into the injection borehole, according to an embodiment of the present invention.

Carbon dioxide gas has been used in effort to expose the surface of the oil pool to encourage mixing of the viscous CO2 gas with the viscous oil that was left behind because it was so viscous it could not be pumped, as shown in FIG. 20a-20c.

U.S. patent publication 2015/0260022 describes the use of solid bars of cold carbon dioxide dropped down the injection borehole so that the bars impact the oil pool violently and even may break up the cylinders. The warm oil and the cold carbon dioxide causes the solid carbon dioxide to rapidly release gaseous carbon dioxide as the pieces of solid carbon dioxide jet into all the near and far away portions of the viscous oil and mixing with the oil that is traversed.

The abandoned oil well is now again activated so that the existing hardware at the site can be activated again to continue pumping the remaining oil to the surface.

This is an example of how the CO2 taken from the plume of a carbon-fueled power plant is captured and used to recover oil. Oil has many other uses other than combustion. However, even if combustion is the final use of the recovered oil the combustion will result in a power plant plume with CO2 and water removed.

The green community now has coordinated supporting technologies so that waste energy from one area becomes useful feed elsewhere.

Waterless fracking technology is as important to the local green community as it is nationwide. The USA has become a net exporter of energy because of the single development of fracking and production of clean burning and inexpensive natural gas.

It is most unfortunate that conventional fracking consumes so much wastewater, wastewater that contains toxic "surfactant-like" elements so that escaping natural gas can smoothly migrate through the underground water on its way to the production borehole. Because many of the fracking sites are located where there is a drought . . . and where there are farmers who also need water. There are then two competing production activities that are each vital to the nation with high priority. There is also a danger that the toxic fracking solution will penetrate aquifers and poison water not even available for use yet.

In states that have been free of even low level earthquakes, experience earthquakes after fracking operations were initiated. Once the fracking started and the fracking fluids lubricated fault surfaces the earthquakes were encouraged. In those states, accommodation has been reached wherein there is not a complete shutdown of operation but smaller quantities of water used so that the newly occurring earthquakes are at low amplitude.

The green community that has the good fortune to be located over an oil or gas bearing shale can use their power plant flue emissions to generate clean water, and also the high-pressure liquid carbon dioxide, to obtain the oil or gas . . . without using precious water and even generating water from the power plant flue emissions.

Figure 21A:
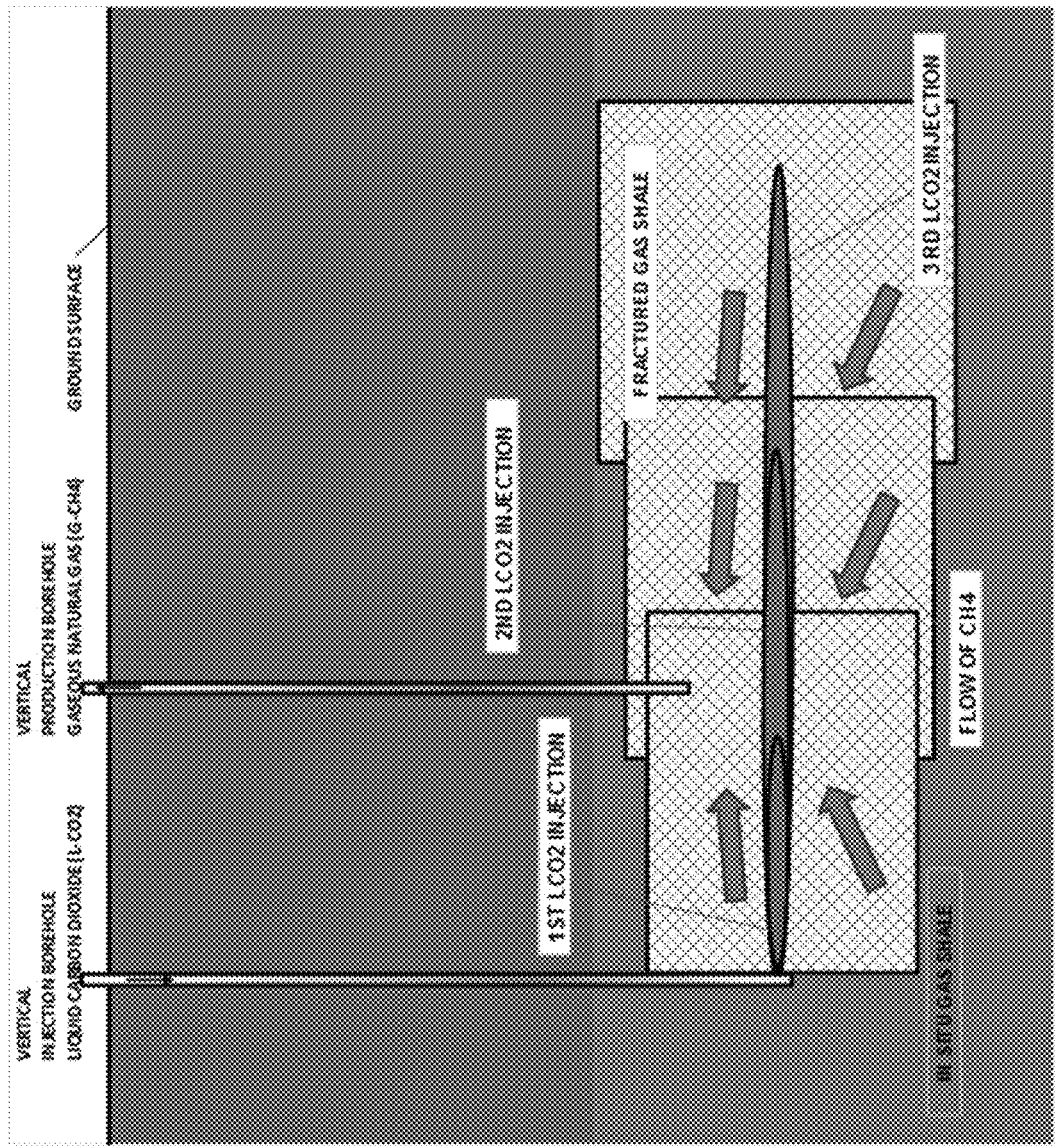
FIG. 21a is a diagram illustrating of high pressure, liquid CO2 fracking with pulsating pressure, according to an embodiment of the present invention.
Figure 21B:
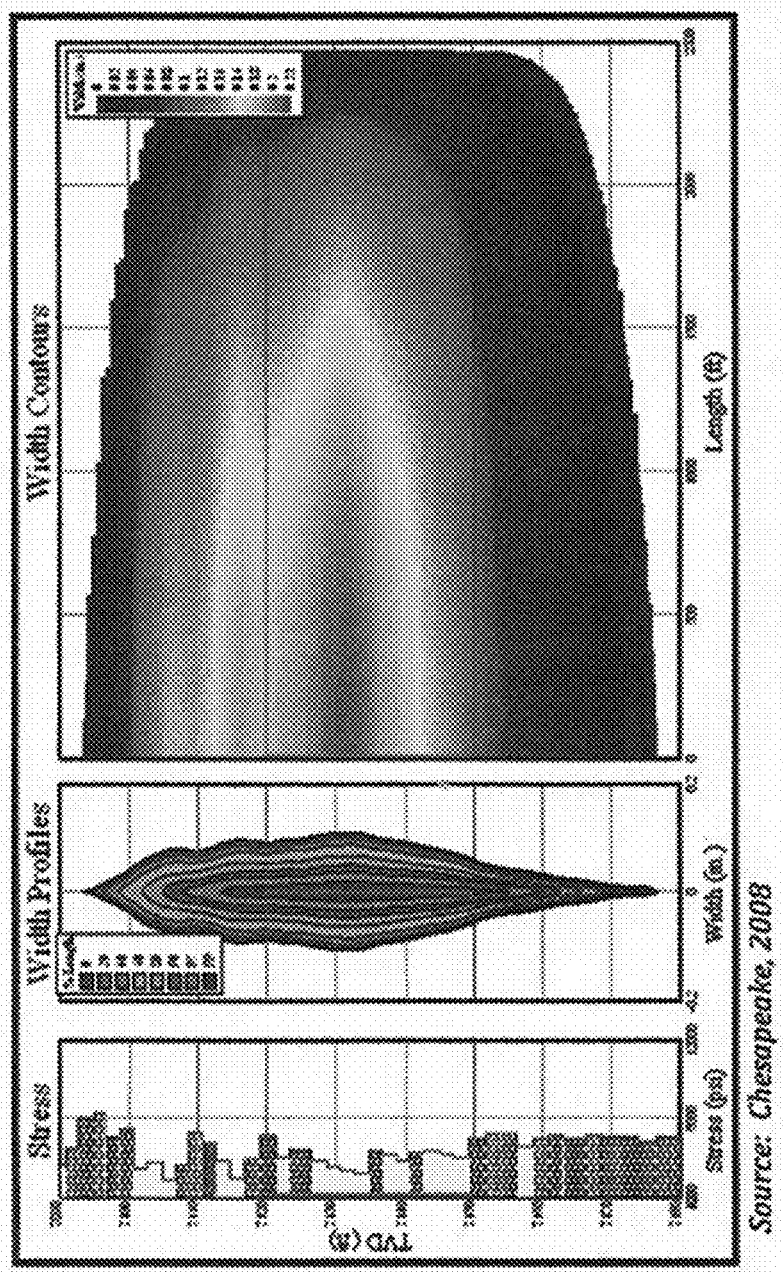
FIG. 21b illustrates the shape of the high length to diameter cavity in the shale formed by the impingement of a high-pressure liquid jet, according to an embodiment of the present invention.
Figure 21C:
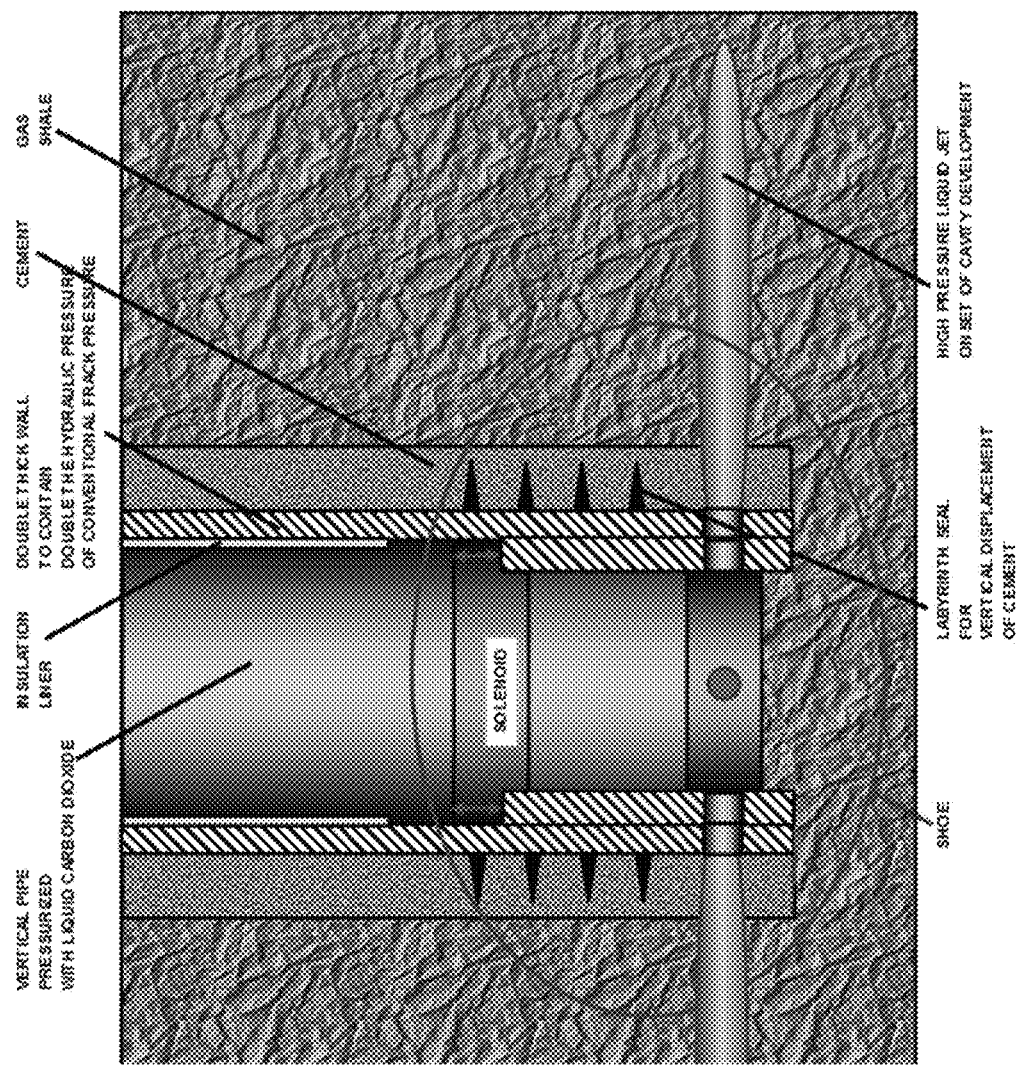
FIG. 21c depicts the bottom of the injection bore hole, according to an embodiment of the present invention.

The use of the liquid carbon dioxide to enter the existing wide spread crevices, but to also fracture the shale itself to form more areas for carbon gas entry and adsorption, as shown in FIGS. 21a-21c. The desorbed natural gas escapes toward production borehole via the passageways between the shale rubble. The escape of the natural gas does not compete with any high-pressure fluid (such as water) because the liquid CO2 was vaporized and already adsorbed into the shale.

There is no remaining liquid because the liquid carbon dioxide has formed itself into a gas and adsorbed itself onto the shale surfaces as a film on a microscopic scale. There is no residual liquid introduced to lubricate earthquake faults so there is no earthquake threat.

Rather than using toxic water as the pressurized fluid that may escape into the water aquifer and poison the future source of fresh water, any migration of liquid or gaseous CO2 in the aquifer will form seltzer water, clean enough, for use on the dining room table.

Thus, the green community coordinates several technologies to operate their carbon-based fuel power plant, removes CO2 from the power plant flue, sequesters the captured CO2 permanently in the underground shale and produces natural gas on a commercial scale. In addition, the water vapor is recovered from the power plant flue. And there will be no threat of earthquakes.

The method of waterless fracking has been captured in U.S. Pat. Nos. 8,833,474 and 9,453,399 "method and apparatus for using pressure cycling and cold liquid CO2 for releasing natural gas from coal and shale formations", and U.S. Pat. No. 8,839,875 "method and apparatus for sequestering CO2 gas and releasing natural gas from coal and gas shale formations".

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

We claim:

1. A green community system comprising:
   one or more air compressors;
   a transportable compressed air energy storage system in fluid communication with the one or more air compressors; said transportable compressed air energy storage system having one or more pressure vessels;
   a transfer line compressed air energy storage system in fluid communication with the transportable compressed air energy storage system;
   one or more companders in communication with the transfer line compressed air energy storage system, wherein the one or more companders exhaust super-chilled air;
   one or more centrifuges configured to receive super-chilled air exhausted from the one or more companders, remove ice particulate, and exhaust super-chilled air; and one or more natural gas electric generator sets in fluid communication with the exhausted super-chilled air from the one or more centrifuges;

wherein the super-chilled air exhausts from the one or more companders or the one or more one or more natural gas electric generator sets to one or more facilities to provide a heating, ventilation, and air-conditioning system (HVAC).

2. The green community system of claim 1, wherein the one or more natural gas electric generators provide electricity and HVAC to the one or more facilities.

3. The green community system of claim 1, wherein the one or more air compressors are powered by a green energy source.

4. The green community system of claim 3, wherein the green energy source is a wind turbine farm.

5. The green community system of claim 4, wherein one or more of the one or more air compressors are powered off if the wind turbine farm does not provide enough electricity to power all of the one or more air compressors.

6. The green community system of claim 3, wherein the green energy source is a photovoltaic panel farm.

7. A green community system comprising:
one or more air compressors;
a transportable compressed air energy storage system in fluid communication with the one or more air compressors; said transportable compressed air energy storage system having one or more pressure vessels;
a transfer line compressed air energy storage system in fluid communication with the transportable compressed air energy storage system;
one or more companders receiving compressed air from the transfer line compressed air from the transfer line compressed air energy storage, wherein the one or more companders exhaust super-chilled air;
one or more natural gas electric generator sets in fluid communication with the exhausted super-chilled air from the one or more companders;
one or more purification towers, wherein the one or more purification towers receive super-chilled air exhausted from the one or more companders, and wherein the one or more purification towers purify water from a waste water source, and wherein the one or more purification tower exhaust chilled air; and
a natural gas electric generator set receiving chilled air from the one or more purification towers,
wherein the super-chilled air exhausts from the one or more companders or the one or more one or more natural gas electric generator sets to one or more facilities to provide a heating, ventilation, and air-conditioning system (HVAC), and wherein the super-chilled air exhausts to the one or more natural gas electric generators.

8. The green community system of claim 7, wherein the waste water source is a mining pond.

9. The green community system of claim 7, wherein the waste water source is a brackish water source.

10. A green community comprising:
one or more air compressors;
a transportable compressed air energy storage system in fluid communication with the one or more air compressors; said transportable compressed air energy storage system having one or more pressure vessels;
a transfer line compressed air energy storage system in fluid communication with the transportable compressed air energy storage system;
one or more companders receiving compressed air from the transfer line compressed air energy storage system, wherein the one or more companders exhaust super-chilled air;
one or more natural gas electric generator sets in fluid communication with the exhausted super-chilled air from the one or more turbo companders; and
a coal fired power plant receiving super-chilled air exhausted from the one or more companders,
wherein gaseous waste exhausted from the coal fired power plant is treated with the super-chilled air to separate carbon dioxide and water from the gaseous waste wherein the super-chilled air exhausts from the one or more companders or the one or more one or more natural gas electric generator sets to one or more facilities to provide a heating, ventilation, and air-conditioning system (HVAC), and wherein the super-chilled air is exhausts to the one or more natural gas electric generators.

11. The green community system of claim 10, wherein the separated carbon dioxide is captured as dry ice.

12. The green community system of claim 11, wherein the dry ice is used to recover oil from an abandoned oil well.

13. The green community system of claim 10, wherein the separated carbon dioxide is captured and pressurized to form liquid carbon dioxide.

14. The green community system of claim 13, wherein the liquid carbon dioxide is used for waterless fracking.

15. The green energy system of claim 1, wherein at least one of the one or more pressure vessels is an underwater pressure vessel.

16. The green energy system of claim 1, wherein at least one of the one or more pressure vessels is an under sea bed pressure vessel.

* * * * *